US012122597B2

(12) United States Patent
Boivin et al.

(10) Patent No.: US 12,122,597 B2
(45) Date of Patent: Oct. 22, 2024

(54) SYSTEM FOR LIFTING AND TIPPING A BIN CONTAINING SOLID WASTE MATERIALS IN A CONTAINER BODY AND CONTAINER ASSEMBLY HAVING THE SAME

(71) Applicant: 11667491 CANADA INC., Saint-Jean-sur-Richelieu (CA)

(72) Inventors: Eric Boivin, Levis (CA); Shihao Shao, Levis (CA); Hugo Marsan, Saint-Jean-sur-Richelieu (CA)

(73) Assignee: 11667491 CANADA INC., Saint-Jean-sur-Richelieu (CA)

( * ) Notice: Subject to any disclaimer, the term of this patent is extended or adjusted under 35 U.S.C. 154(b) by 207 days.

(21) Appl. No.: 17/767,355

(22) PCT Filed: Oct. 6, 2020

(86) PCT No.: PCT/CA2020/051339
§ 371 (c)(1),
(2) Date: Apr. 7, 2022

(87) PCT Pub. No.: WO2021/068063
PCT Pub. Date: Apr. 15, 2021

(65) Prior Publication Data

US 2022/0396425 A1 Dec. 15, 2022

Related U.S. Application Data

(60) Provisional application No. 62/911,916, filed on Oct. 7, 2019.

(51) Int. Cl.
*B65F 3/04* (2006.01)
*B65F 3/02* (2006.01)
(Continued)

(52) U.S. Cl.
CPC .............. *B65F 3/048* (2013.01); *B65F 3/046* (2013.01); *B65F 3/205* (2013.01); *B65F 3/208* (2013.01); *B65F 3/26* (2013.01); *B65F 2003/023* (2013.01)

(58) Field of Classification Search
CPC .. B65F 3/04; B65F 3/041; B65F 3/046; B65F 3/048; B65F 3/20; B65F 3/205;
(Continued)

(56) References Cited

U.S. PATENT DOCUMENTS 2,101,067 A * 12/1937 Howard .................... B65F 3/04 414/473
2,105,329 A * 1/1938 Orlowsky ................ B65F 3/04 414/487
(Continued)

FOREIGN PATENT DOCUMENTS

DE 870972 C 3/1953
FR 2677338 A1 12/1992

OTHER PUBLICATIONS

International Search Report and Written Opinion issued in corresponding International application No. PCT/CA2020/051339 on Dec. 31, 2020.
(Continued)

*Primary Examiner* — James Keenan
(74) *Attorney, Agent, or Firm* — BCF LLP

(57) ABSTRACT

A system for lifting and tipping a bin containing solid waste materials in a container body and for compacting the solid waste materials in the container body includes a motor, a packer plate, and at least one linkage assembly operatively connected to the motor. When the motor is operated, the at least one linkage assembly is configured for lifting the bin above the container body, tipping the bin, pivoting the packer plate from a retracted position to a compacting position and then from the compacting position to the
(Continued)

retracted position, and lowering the bin back down. A solid waste materials collection and compaction container assembly has a container body and a system for lifting and tipping a bin in the container body, and for compacting solid waste materials in the container body.

19 Claims, 14 Drawing Sheets

(51) Int. Cl.
*B65F 3/20* (2006.01)
*B65F 3/26* (2006.01)

(58) Field of Classification Search
CPC .... B65F 3/208; B65F 3/26; B65F 2003/0223; B65F 2003/0246; B65F 2003/025
See application file for complete search history.

(56) References Cited

U.S. PATENT DOCUMENTS 2,592,085 A * 4/1952 Van Doorne ............. B65F 3/04 414/415
2,750,056 A * 6/1956 Dow ....................... B65F 3/041 414/501
3,069,037 A * 12/1962 Dow ......................... B65F 3/20 414/518
3,458,071 A * 7/1969 Smith ....................... B65F 3/26 414/408
3,881,613 A 5/1975 Torimoto et al.
4,406,573 A 9/1983 Colin
4,786,228 A 11/1988 Mazzocchia et al.

OTHER PUBLICATIONS

Supplementary European Search Report issued in co-pending European patent application No. 20873683.5 on Mar. 1, 2024.

* cited by examiner

SYSTEM FOR LIFTING AND TIPPING A BIN CONTAINING SOLID WASTE MATERIALS IN A CONTAINER BODY AND CONTAINER ASSEMBLY HAVING THE SAME

CROSS-REFERENCE TO RELATED APPLICATION

The present application claims priority to U.S. Provisional Patent Application Ser. No. 62/911,916, filed Oct. 7, 2019, entitled "System For Lifting And Tipping A Bin Containing Solid Waste Materials In A Container Body and Container Assembly Having The Same", which is incorporated by reference herein in its entirety.

FIELD OF TECHNOLOGY

The present technology relates to systems for lifting and tipping a bin containing solid waste materials in a container body, and for compacting the solid waste materials in the container body, and to solid waste materials collection and compaction container assemblies.

BACKGROUND

There exists various types of collection and compaction systems and vehicles being equipped with such systems for lifting and tipping a bin containing solid waste materials in a container body, and for compacting the solid waste materials in the container body. The solid waste materials can be of any kind, including trash, recyclable materials and organic materials.

Some systems are configured to execute an automated sequence of actions including (i) lifting up the bin containing solid waste materials, (ii) tipping the bin for emptying its content in a hopper of the container body through gravity, (iii) compacting the solid waste materials in a container, and (iv) lowering the bin back down. These actions involve different subsystems that have their own subset of components, and all of these actions must be performed in the right sequence and with the appropriate timing in order to provide an efficient collecting and compacting of the solid waste materials. These different subsystems and their associated components increase the complexity of the collection and compaction systems.

Therefore, there is a desire for reducing the complexity, weight and cost of such collection and compaction systems for solid waste materials.

SUMMARY

It is an object of the present technology to ameliorate at least some of the inconveniences present in the prior art.

According to one aspect of the present technology, there is provided a system for lifting and tipping a bin containing solid waste materials in a container body, and for compacting the solid waste materials in the container body. The system includes a frame, a motor connected to the frame, a packer plate pivotally connectable to the container body and being pivotable between a retracted position and a compacting position within the container body. The packer plate is configured for compacting the solid waste materials in the container body when moved from the retracted position to the compacting position. The system further includes at least one linkage assembly operatively connected to the motor, and in response to the motor operating, the at least one linkage assembly is configured for lifting the bin above the container body, tipping the bin for emptying the solid waste materials into the container body, pivoting the packer plate from the retracted position to the compacting position and then from the compacting position to the retracted position, and lowering the bin back down.

In some embodiments, the at least one linkage assembly includes a lift arm pivotally connected to the frame and structured for lifting the bin above the container body, the lift arm having an intermediate pivot, a tipping arm pivotally connected to the frame and adapted for tipping the bin in the container body when lifted above the container body by the lift arm, a drive member operatively connected to the motor, the drive member rotating about a drive axis, and including a drive member pivot, a packer plate link rotatably connected between the drive member pivot and the packer plate, and a lift arm link rotatably connected between the drive member pivot and the intermediate pivot. Rotating the drive member about the drive axis results in the lift arm lifting the bin above the container body, the tipping arm tipping the bin for emptying the solid waste materials into the container body, the packer plate pivoting from the retracted position to the compacting position and then from the compacting position to the retracted position, and the lift arm lowering the bin back down.

In some embodiments, one continuous rotation of the drive member about the drive axis results in lifting the bin above the container body, tipping the bin for emptying the solid waste materials into the container body, pivoting the packer plate from the retracted position to the compacting position and then from the compacting position to the retracted position, and lowering the bin back down.

In some embodiments, the drive member pivot defines a drive member pivot axis, the packer plate includes an upper packer plate pivot defining an upper packer plate pivot axis, the packer plate link being pivotally connected to the upper packer plate pivot, a first plane contains the drive axis and the drive member pivot axis, a second plane contains the drive member pivot axis and the upper packer plate pivot axis, and when the packer plate is in the compacting position, an obtuse angle defined between the first plane and the second plane is greater than 160 degrees.

In some embodiments, the motor drives a gearbox output shaft, the gearbox output shaft rotating about the drive axis, and the drive member is connected to the gearbox output shaft.

In some embodiments, at least one of the container body, the lift arm, the tipping arm, the packer plate link, the drive member and the lift arm link is made of fiber-reinforced polymeric materials.

In some embodiments, the packer plate has an upper portion and a lower portion, and when connected to the container body, the packer plate pivots between the retracted position and the compacting position about a lower packer plate pivot axis extending along the lower portion of the packer plate.

In some embodiments, the system further has a follower panel having an upper portion and a lower portion, the lower portion of the follower panel being pivotally connected to the upper portion of the packer plate about a follower panel axis, and the follower panel being movable between a retracted position and a compacting position simultaneously with the packer plate.

In some embodiments, when connected to the container body and when in their respective retracted positions, the packer plate and the follower panel are substantially parallel.

In some embodiments, the system further includes a roller assembly connected to the upper portion of the follower panel for rolling along a portion of the container body.

In some embodiments, the system further includes a flexible panel connected to the upper portion of the follower panel and extending above the roller assembly.

In some embodiments, the at least one linkage assembly is a left linkage assembly and a right linkage assembly.

According to another aspect of the present technology, there is provided a solid waste materials collection and compaction container assembly, including a container body including a floor, a front wall connected to a front end of the floor and extending upwardly from the floor, a left side wall connected to the floor and the front wall, the left side wall extending upwardly from a left end of the floor and rearward of the front wall, a right side wall connected to the floor and the front wall, the right side wall extending upwardly from a right end of the floor and rearward of the front wall, a rear wall connected to the floor and to the left and right side walls, the rear wall extending upwardly from a rear end of the floor, a top wall connected to the front wall and to the left and right side walls, the top wall extending over a portion of the floor, and a system for lifting and tipping a bin containing solid waste materials in the container body, and for compacting the solid waste materials in the container body. The system includes a frame pivotally supporting the container body about a container pivot axis, the container body being pivotable about the container pivot axis between a rest position and a dump position, a motor connected to the frame, a packer plate pivotally connected to the container body and being pivotable between a retracted position and a compacting position within the container body, the packer plate being configured for compacting the solid waste materials in the container body when pivoted from the retracted position to the compacting position, and at least one linkage assembly operatively connected to the motor. In response to the motor operating, the at least one linkage assembly is configured for lifting the bin above the container body, tipping the bin for emptying the solid waste materials into the container body, pivoting the packer plate from the retracted position to the compacting position and then from the compacting position to the retracted position, and lowering the bin back down.

In some embodiments, the container assembly further includes a lock movable between an unlocked position and a locked position. In response to the lock being in the unlocked position, the packer plate is pivotable within the container body between the retracted and compacting positions, and in response to the lock being in the locked position, the packer plate is maintained in the retracted position, and operating the motor in a first direction causes the container body to pivot upwardly about the container pivot axis between the rest position and the dump position.

In some embodiments, in response to the lock being in the locked position, operating the motor in a second direction causes the container body to pivot downwardly about the container pivot axis between the dump position and the rest position.

In some embodiments, the container assembly further includes a linear actuator connected to a rear face of the packer plate, the linear actuator moving the lock between the locked and unlocked positions.

In some embodiments, the container assembly further includes a follower panel having an upper portion and a lower portion, the lower portion of the follower panel being pivotally connected to the packer plate about a follower panel axis, the upper portion of the follower panel including a roller assembly for rolling along a portion of the container body, the follower panel being movable between a retracted position and a compacting position simultaneously with the packer plate, and a lower movable panel extending in the container body, the follower panel abutting the lower movable panel when in the compacting position.

In some embodiments, the lower movable panel pivots towards the front wall of the container body when the solid waste materials are introduced in the container body, keeps the solid waste materials inside the container body when the container body is in the rest position, and moves towards the rear wall when the container body is pivoted from the rest position to the dump position.

In some embodiments, the container assembly further includes an upper movable panel pivotally connected to the top wall of the container body, the upper movable panel being selectively pivotable about an upper panel pivot axis between a closed position and an open position when the container body is pivoted from the rest position to the dump position.

In some embodiments, the system is located in a rear portion of the container body.

In some embodiments, the top wall, the rear wall and the left and right side walls define a hopper located in the rear portion of the container body.

In some embodiments, the container assembly further includes a left baffle connected to the left side wall and the rear wall, the left baffle projecting from the left side wall toward right side wall; and a right baffle connected to the right side wall and the rear wall, the right baffle projecting from the right side wall toward the left side wall.

In some embodiments, at least one of the left and right baffles includes a deflection plate extending in the hopper for directing the solid waste materials towards the packer plate.

In some embodiments, the motor is located under the container body.

In some embodiments, the container assembly further includes a torsion spring connected between the frame and the container body, the torsion spring being adapted for pivoting the container body about the container pivot axis from the rest position to the dump position.

There is also provided a truck having a truck frame, a vehicle motor connected to the truck frame, at least three wheels operatively connected to the frame, at least one of the at least three wheels being driven by the vehicle motor, and the solid waste materials collection and compaction container assembly as described above connected to the truck frame.

In some embodiments, the motor of the system and the vehicle motor are electric motors.

According to yet another aspect of the present technology, there is provided a solid waste materials collection and compaction container assembly, including a container body and a packer plate having an upper portion and a lower portion. The packer plate is disposed inside the container body and being pivotally connected to the container body. The packer plate is pivotable between a retracted position and a compacting position about a packer plate pivot axis extending along the lower portion of the packer plate, the packer plate compacting solid waste materials in the container body in response to being pivoted from the retracted position to the compacting position.

In some embodiments, the solid waste materials collection and compaction container assembly further includes a follower panel having an upper portion and a lower portion, the lower portion of the follower panel being pivotally connected to the upper portion of the packer plate about a follower panel axis, and the follower panel being movable between a retracted position and a compacting position simultaneously with the packer plate.

In some embodiments, when in their respective retracted positions, the packer plate and the follower panel are substantially parallel.

In some embodiments, the solid waste materials collection and compaction container assembly further includes a roller assembly connected to the upper portion of the follower panel for rolling along a portion of the container body.

In some embodiments, the container body has a front wall, and in response to the packer plate pivoting from the retracted position to the compacting position, the packer plate pivots towards the front wall of the container body.

In some embodiments, the solid waste materials collection and compaction container assembly further includes an actuation system operatively connected to the packer plate for pivoting the packer plate between the retracted position and the compacting position, and at least a portion of the actuation system passes through an aperture defined in a rear wall of the container body.

One of the objects of the present technology is to use a single motor to move the at least one linkage assembly of the system for lifting up the bin, tipping the bin for emptying its content in the container body, compacting the solid waste materials in the container body, and lowering the bin back down. In another aspect of the present technology, the system is also configured for using the same motor for pivoting the container body between the rest position for collecting and compacting the solid waste materials and the dump position for dumping its content. Thus, the present technology has a reduced number of parts over the systems of the prior art that use a plurality of motors or linear actuators (such as hydraulic cylinders) to perform any one of the combinations of the aforementioned actions. Another object of the present technology is to provide a solid waste materials collection and compaction container assembly having a packer plate that is pivotally connected to a container body about a packer plate pivot axis that extends along a lower portion of the packer plate, and that compacts the solid waste materials in the container body when pivoted from the retracted position to the compacting position. Such position and configuration of the packer plate allows, in some embodiments, for (i) lowering the center of mass and improving the stability of the container assembly, (ii) for connecting the actuation system of the packer plate to the linkage assembly lifting and tipping the bin in the container assembly, and (iii) for emptying the container without restriction during dumping.

For purposes of this application, terms related to spatial orientation such as forward, rearward, upwardly, downwardly, upper, lower, left, and right, are as they would normally be understood by a driver of the solid waste collection vehicle sitting in the driver seat in a normal riding position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying figures and the appended claims.

BRIEF DESCRIPTION OF THE FIGURES

For a better understanding of the present technology, as well as other aspects and further features thereof, reference is made to the following description which is to be used in conjunction with the accompanying figures, where.

DETAILED DESCRIPTION

Figure 1A:
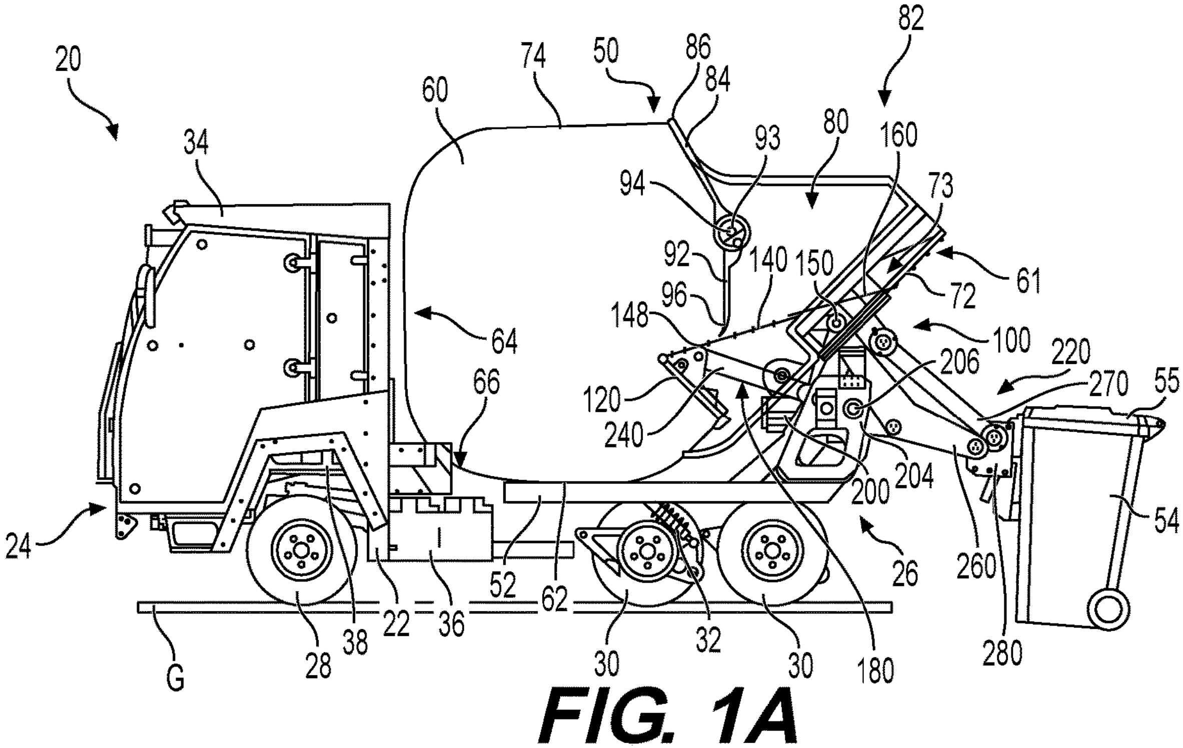
FIG. 1A is a left side elevation view of a solid waste collection truck having a solid waste materials collection and compaction container assembly in accordance with an embodiment of the present technology, with a left side wall of a container body removed for illustrating the components of the assembly inside the container body, with a packer plate in a compacting position, and with a lift arm of the assembly grabbing a bin resting on a ground surface.

Referring to FIG. 1A, a truck 20 is shown on a flat ground surface G. The truck 20 has a truck frame 22 defining a front end 24 and a rear end 26 of the truck 20, two front wheels 28, and four rear wheels 30 (only the left wheels 28, 30 are shown) operatively connected to the truck frame 22 by rear suspension assemblies 32. It is contemplated that the truck 20 could have more or less wheels 28, 30. The truck 20 further has a cab 34 in which a driver sits and controls different systems of the truck 20. The truck 20 is an electric vehicle and is powered by a battery pack 36 connected to the truck frame 22. The battery pack 36 powers a vehicle motor 38 (which is an electric motor and schematically shown in FIG. 1A) and a power system (not shown) of the truck 20. At least some of the wheels 28, 30 are driven by the vehicle motor 38. The truck 20 can be operated with a crew of one. It is contemplated that in other embodiments the truck 20 could be powered by an internal combustion engine and could be of a different size, shape and configuration with more than one operator sitting in the cab 34 or riding at the back of the truck 20.

A solid waste materials collection and compaction container assembly 50 is connected to the truck frame 22 of the truck 20. The solid waste materials collection and compaction container assembly 50 is a rear loader, i.e. the solid waste materials are collected from the rear end 26 of the truck 20. It is contemplated that in other embodiments the assembly 50 could be arranged to be a front loader. The truck 20 and the solid waste materials collection and compaction container assembly 50 have a relatively high loading height and are designed to make short collect runs in narrow alleys of a city, and dump the solid waste materials collected in a bin (not shown) located outside the city center for disposal.

Figure 3A:
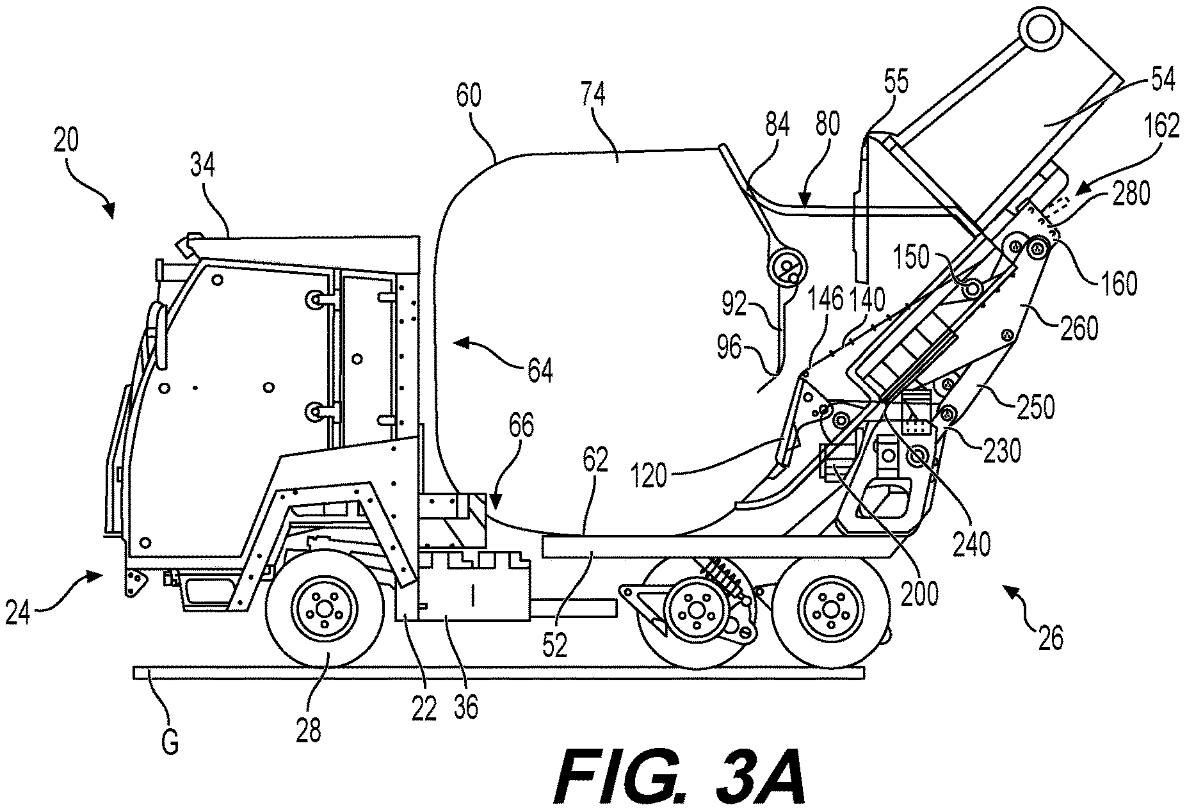
FIG. 3A is a left side elevation view of the truck of FIG. 1A, with the packer plate in an intermediate position and the bin being tipped in the container body.
Figure 3B:
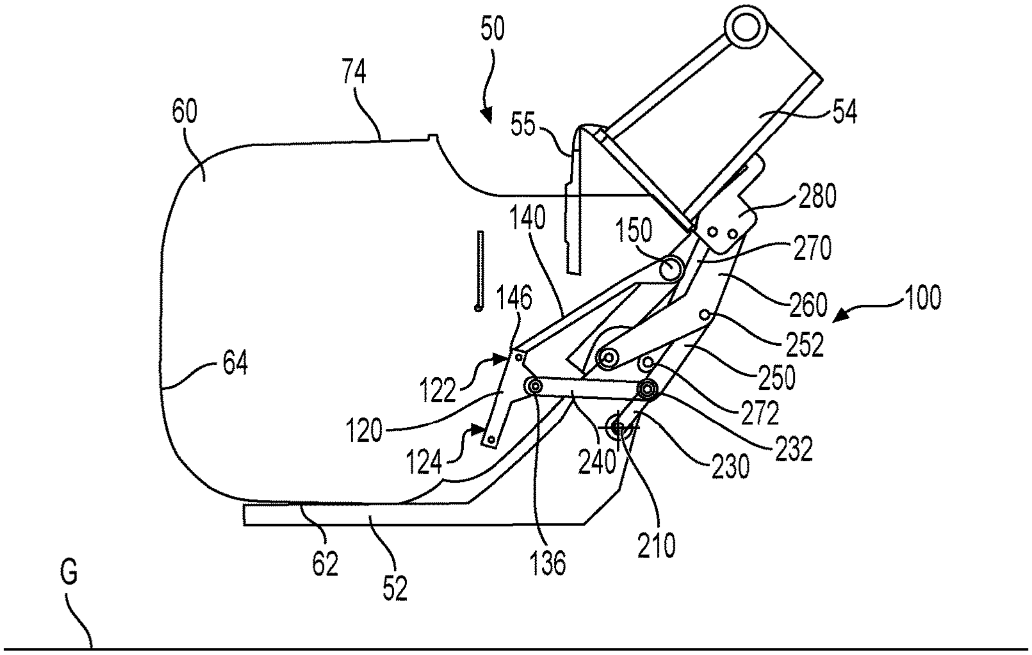
FIG. 3B is a schematic left side elevation view of the assembly of FIG. 1A, with the packer plate in the intermediate position and the bin being tipped in the container body.

The assembly 50 has a frame 52 that is connected to the truck frame 22 of the truck 20. The frame 52 pivotally supports a container body 60, and a system 100 for lifting a bin 54 disposed on the ground surface G and containing solid waste materials, and tipping the bin 54 to an inverted position to allow the solid waste materials to flow by gravity from the bin 54 into the container body 60. A lid 55 of the bin 54 opens when the bin 54 is in the inverted position (FIGS. 3A and 3B). Although the bin 54 is herein described and illustrated in the accompanying Figures, the system 100 could be configured for lifting a basket or any other recipient containing solid waste materials. The system 100 is further adapted for compacting the solid waste materials in the container body 60. As the solid waste materials collection and compaction container assembly 50 is a rear loader, the system 100 is located in a rear portion 61 (FIG. 1A) of the container body 60. The system 100 will be described in detail below, but first the container body 60 will be described with reference to FIGS. 1A and 1B.

Figure 1B:
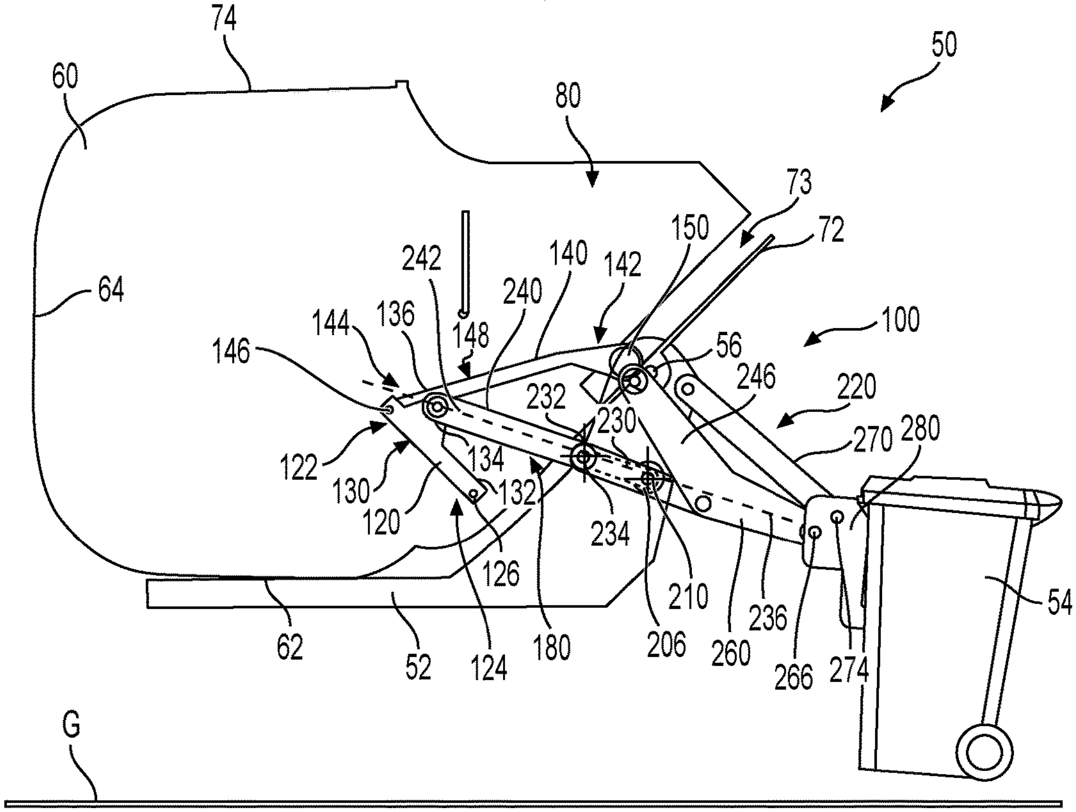
FIG. 1B is a schematic left side elevation view of the assembly of FIG. 1A, with the lift arm grabbing the bin resting on the ground surface.
Figure 7A:
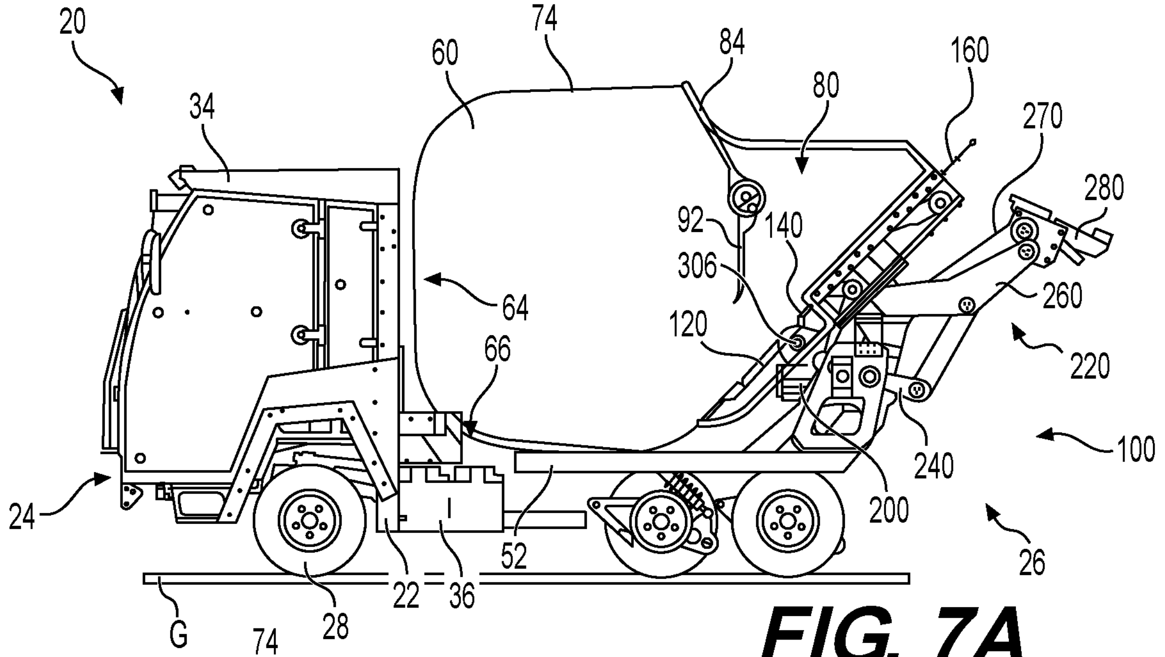
FIG. 7A is a left side elevation view of the truck of FIG. 1A, with the lift arm raised, and the container body pivoted in a rest position.
Figure 7B:
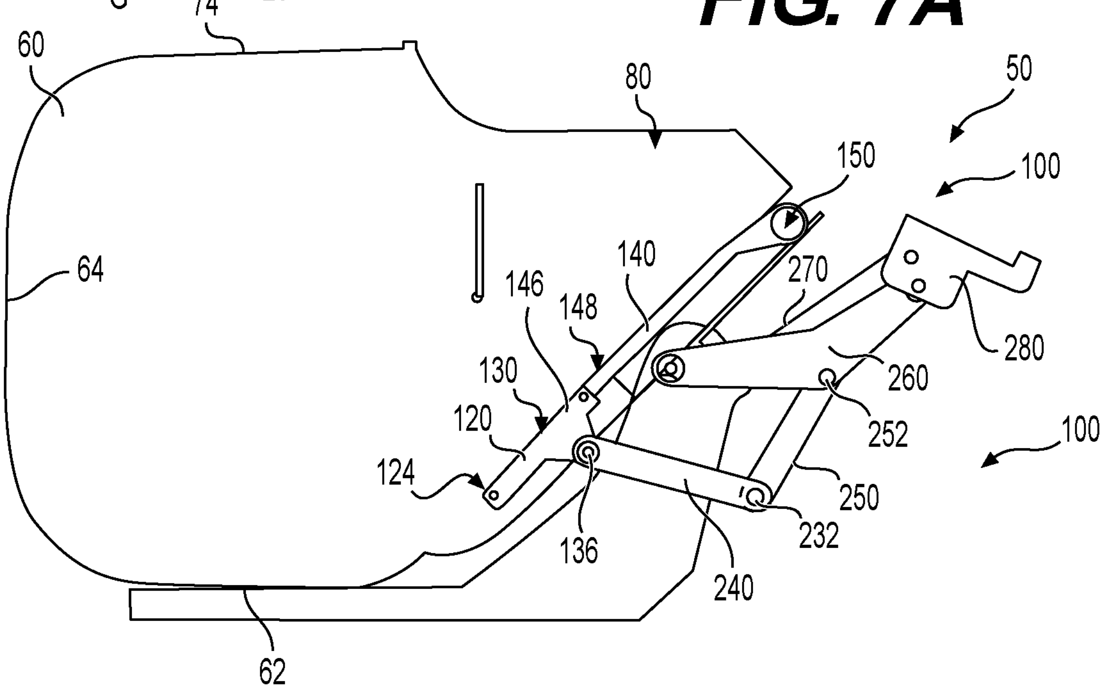
FIG. 7B is a schematic left side elevation view of the assembly of FIG. 1A, with the lift arm raised, and the container body pivoted in the rest position.
Figure 8A:
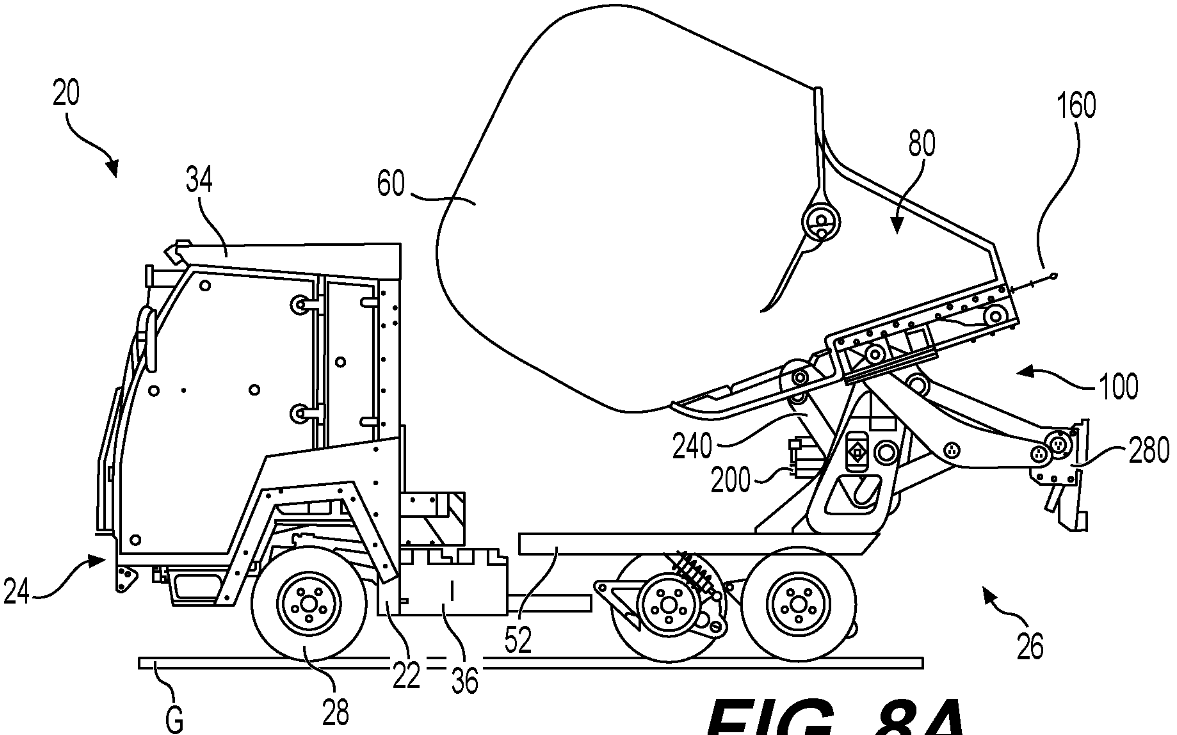
FIG. 8A is a left side elevation view of the truck of FIG. 1A, with the container body pivoted upwardly from the rest position in an intermediate position.
Figure 8B:
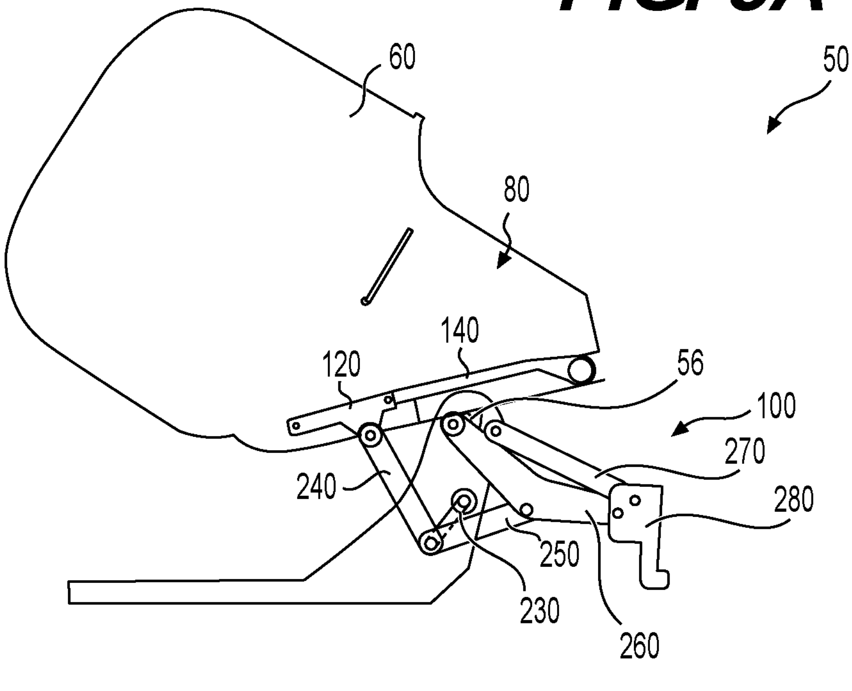
FIG. 8B is a schematic left side elevation view of the assembly of FIG. 1A, with the container body pivoted upwardly from the rest position in an intermediate position.
Figure 9A:
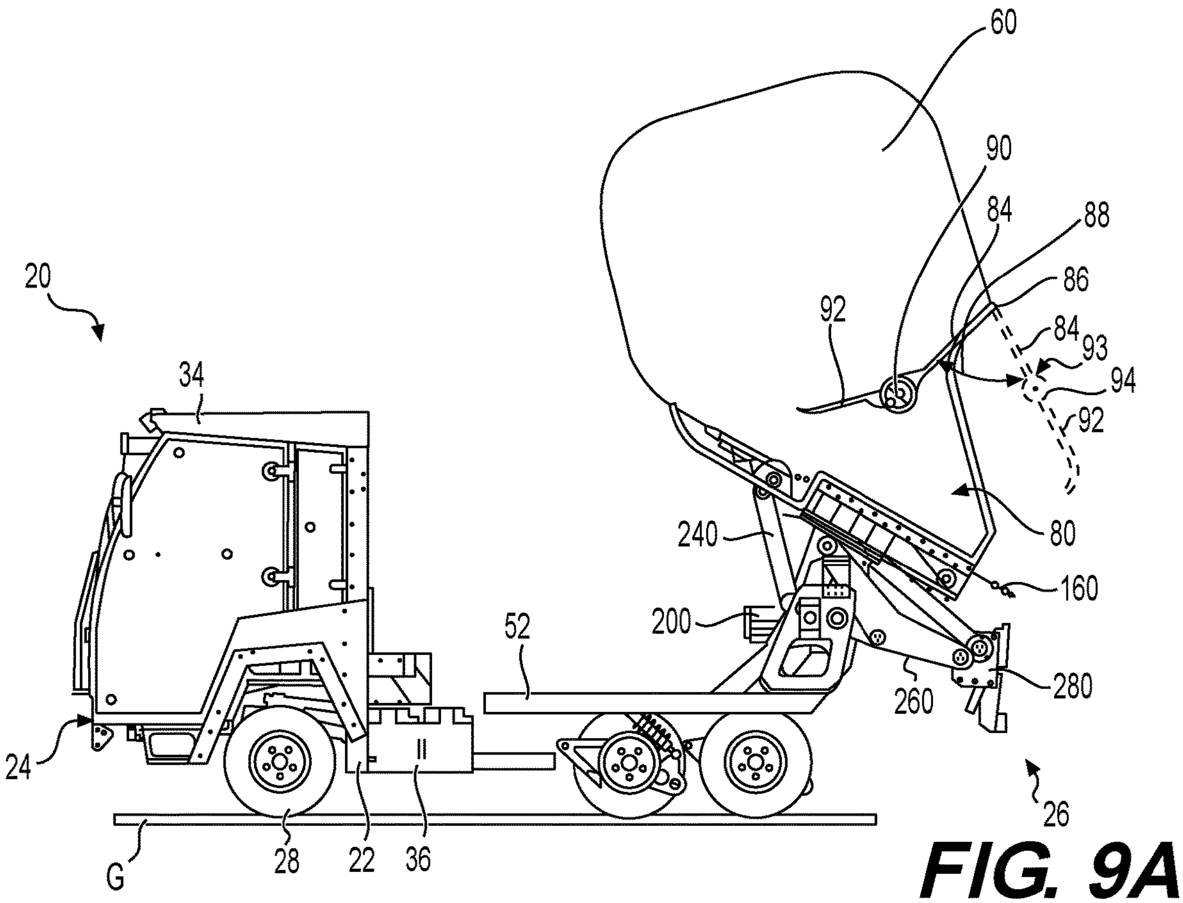
FIG. 9A is a left side elevation view of the truck of FIG. 1A, with the container body pivoted in a dump position.
Figure 9B:
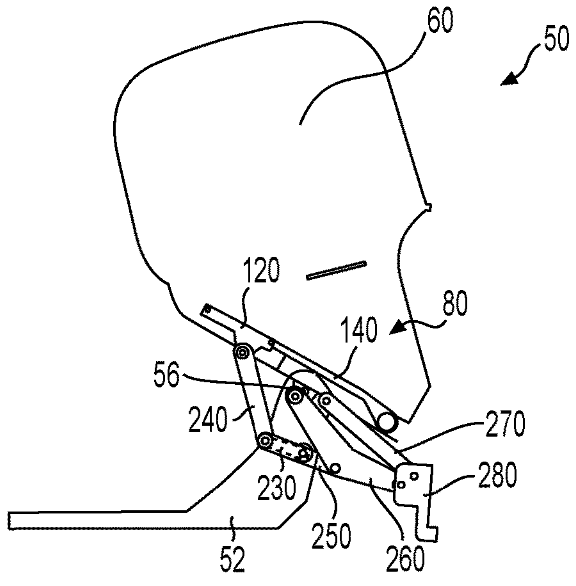
FIG. 9B is a schematic left side elevation view of the assembly of FIG. 1A, with the container body pivoted in a dump position.

The container body 60 is pivotally connected to the frame 52 about a container pivot axis 56 (FIGS. 1B, 8B and 9B). The container body 60 is shown in a rest position in FIGS. 1A to 7B, i.e. the container body 60 rests on the frame 52. From the rest position, the container body 60 is pivotable upwardly to an intermediate position shown in FIGS. 8A and 8B, and to a dump position shown in FIGS. 9A and 9B. When in the dump position, the content of the container body 60 is dumped at the rear end 26 of the truck 20. The container body 60 is dimensioned to receive a certain volume of the solid waste materials and is structured for storing the solid waste materials in a compacted fashion.

Still referring to FIGS. 1A and 1B, the container body 60 has a floor 62. A front wall 64 is connected to a front end 66 of the floor 62 and extends upwardly from the floor 62. A left side wall 68 (FIGS. 6A and 10) is connected to the floor 62 and to the front wall 64. The left side wall 68 extends upwardly from a left end of the floor 62 and rearward of the front wall 64. A right side wall 70 (FIGS. 6A and 10) is connected to the floor 62 and to the front wall 64. The right side wall 70 extends upwardly from a right end of the floor 62 and rearward of the front wall 64. A rear wall 72 is connected to the floor 62 and to the left and right side walls 68, 70. The rear wall 72 extends upwardly from a rear end of the floor 62, and is inclined upwardly towards the rear end 26 of the truck 20. The rear wall 72 also includes a track 73. A top wall 74 is connected to the front wall 64 and to the left and right side walls 68, 70. The top wall 74 extends over a portion of the floor 62. The floor 62, front wall 64, left side wall 68, right side wall 70, rear wall 72 and top wall 74 are made of sheets or panels made of fiber-reinforced polymeric materials, but could be made of a different material such as steel. In some embodiments, the container body 60 could include reinforcement channels and plates. In some embodiments, different thicknesses of sheet or panel are used for different areas of the container body 60, depending on the stresses expected in that area. This helps reduce the weight of the container body 60, and therefore increase the mass of solid waste materials the truck 20 can carry.

A hopper 80 is defined in a rear portion 82 of the container body 60 by the top wall 74, the rear wall 72 and the left and right side walls 68, 70. The solid waste materials are introduced in the container body 60 and dumped therefrom via the hopper 80. The hopper 80 is dimensioned to receive a certain volume of solid waste materials and is shaped to direct, under the force of gravity, the solid waste materials in the container body 60. It is to be understood that the hopper 80 is not necessarily a funnel-shaped receptacle.

Referring to FIG. 1A, the container body 60 further includes an upper movable panel 84 pivotally connected to the top wall 74. The upper movable panel 84 extends across a majority of the width of the container body 60 between the left and right side walls 68, 70. The upper movable panel 84 is inclined forwardly and stops solid waste materials that are projected towards the front end 24 of the truck 20 and directs them towards the hopper 80. The upper movable panel 84 thus acts a front chute panel of the hopper 80. The upper movable panel 84 also keeps the solid waste materials inside the container body 60 when the container body 60 is in the rest position. With additional reference to FIG. 9A, the upper movable panel 84 is selectively pivotable about an upper panel pivot axis 86 (as indicated by double arrow 88) between a closed position (shown in FIGS. 1A to 8A) and an open position (shown in phantom lines in FIG. 9A) when the container body 60 is pivoted upwardly in the dump position. A lock 90 selectively maintains the upper movable panel 84 in the closed position. When unlocked, the upper movable panel 84 is pivotable about the upper panel pivot axis 86. When the container body 60 is moved in the dump position for emptying its content, solid waste materials contained in the container body 60 can pass below the upper movable panel 84 and the upper panel pivot axis 86. The upper movable panel 84 returns to its closed position when the container body 60 is pivoted downwardly back to the rest position. The upper movable panel 84 is made of the same material as the container body 60, but could made of a different material in some embodiments.

Referring back to FIG. 1A, the container body 60 further includes a lower movable panel 92. The lower movable panel 92 extends across a majority of the width of the container body 60 between the left and right side walls 68, 70. The lower movable panel 92 is pivotally connected to the upper movable panel 84 via a hinge 93 which defines a lower panel pivot axis 94. When the lower movable panel 92 pivots towards the front wall 64, the lower movable panel 92 allows the introduction of the solid waste materials in the container body 60. However, the lower movable panel 92 keeps the solid waste materials inside the container body 60 when the container body 60 is in the rest position, and acts as a check valve permitting the introduction of the solid waste materials in the container body 60, while limiting the amount of solid waste materials exiting the container body 60 unexpectedly. A lower portion 96 of the lower movable panel 92 is curved forwardly. With additional reference to FIG. 9A, when the container body 60 is pivoted from the rest position to the dump position, the lower movable panel 92 pivots rearwardly with the upper movable panel 84 towards the rear wall 72 (the lower movable panel 92 is shown in phantom lines in FIG. 9A), and allows the solid waste materials contained in the container body 60 to be dumped through the hopper 80.

Figure 10:
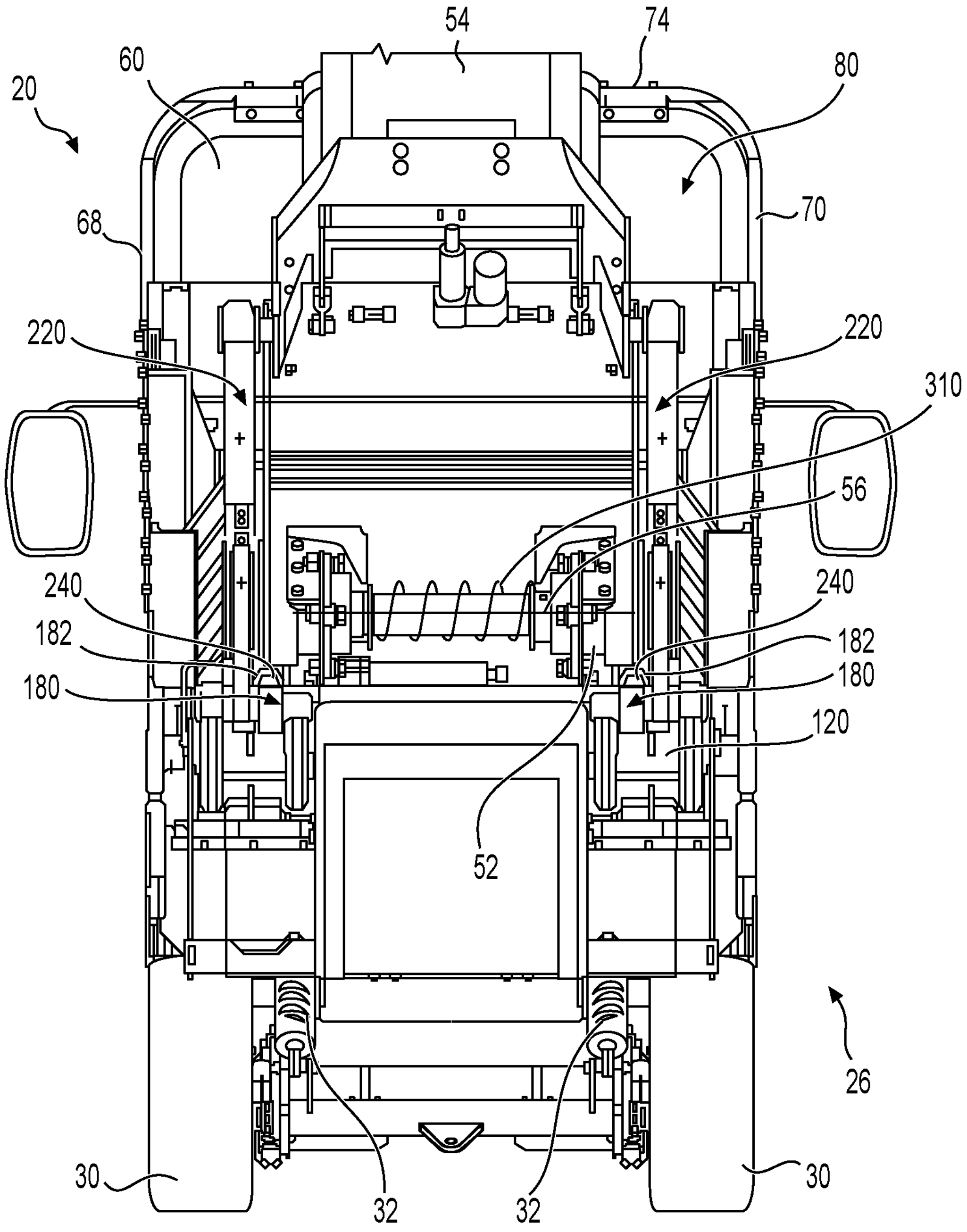
FIG. 10 is a rear view of the truck of FIG. 1A, with the lift arm raised.

Referring now to FIGS. 1A to 5B, the system 100 includes a packer plate 120 pivotally connected to the container body 60 and being pivotable between a retracted position (FIGS. 4A and 4B) and a compacting position (FIGS. 1A and 1B) within the container body 60. The packer plate 120 also extends across a majority of the width of the container body 60 between the left and right side walls 68, 70 (FIG. 10). The packer plate 120 is configured for compacting the solid waste materials in the container body 60 when moved from the retracted position to the compacting position, and thus allows the container body 60 to contain more solid waste materials per unit of volume. The packer plate 120 has an upper portion 122 and a lower portion 124 (FIG. 1B). The packer plate 120 pivots between the retracted position and the compacting position about a lower packer plate pivot axis 126 extending along the lower portion 124 of the packer plate 120. As such, the solid waste materials are pushed toward the front wall 64 of the container body 60 when the packer plate 120 is moved from the retracted position to the compacting position. The packer plate 120 further includes gaskets (not shown) extending along each side thereof. The gaskets assist in preventing solid waste materials from passing between the packer plate 120 and the left and right side walls 68, 70 and reach the back of the packer plate 120. Furthermore, the rear wall 72 has apertures (not shown) defined therein that can allow passage therethrough of solid waste materials that could have passed somehow behind the packer plate 120. In addition, the container body 60 further includes, in some embodiments, a fluid reservoir (not shown) connected to the floor 62 for collecting fluids flowing from the solid waster materials. The fluid reservoir could be disposed rearward of the pack plate 120.

The packer plate 120 is made of steel sheets or plates, but could be made of different materials in other embodiments. The packer plate 120 further has a front face 130 and a rear face 132 (FIG. 1B). The front face 130 of the packer plate 120 could include, in some embodiments, a relatively hard, low-friction coefficient material for reducing wear of the front face 130 and for facilitating the dumping of the solid waste materials when the container body 60 is pivoted in the dump position. The packer plate 120 further includes, on the rear face 132 thereof, an upper packer plate pivot 134 defining an upper packer plate pivot axis 136. The upper packer plate pivot 134 is located in the upper portion 122 of the packer plate 120.

Still referring to FIGS. 1A to 5B, the system 100 further includes a follower panel 140 which promotes the displacement of the solid waste materials from the hopper 80 to the container body 60. The follower panel 140 is made of fiber-reinforced polymeric materials, but could also be made of any other suitable material. The follower panel 140 also extends across a majority of the width of the container body 60 between the left and right side walls 68, 70. The follower panel 140 has an upper portion 142 and a lower portion 144 (FIG. 1B). The lower portion 144 of the follower panel 140 is pivotally connected to the upper portion 122 of the packer plate 120 about a follower panel axis 146. The follower panel axis 146 thus extends along the upper portion 122 of the packer plate 120, adjacent the upper packer plate pivot axis 136.

Figure 4A:
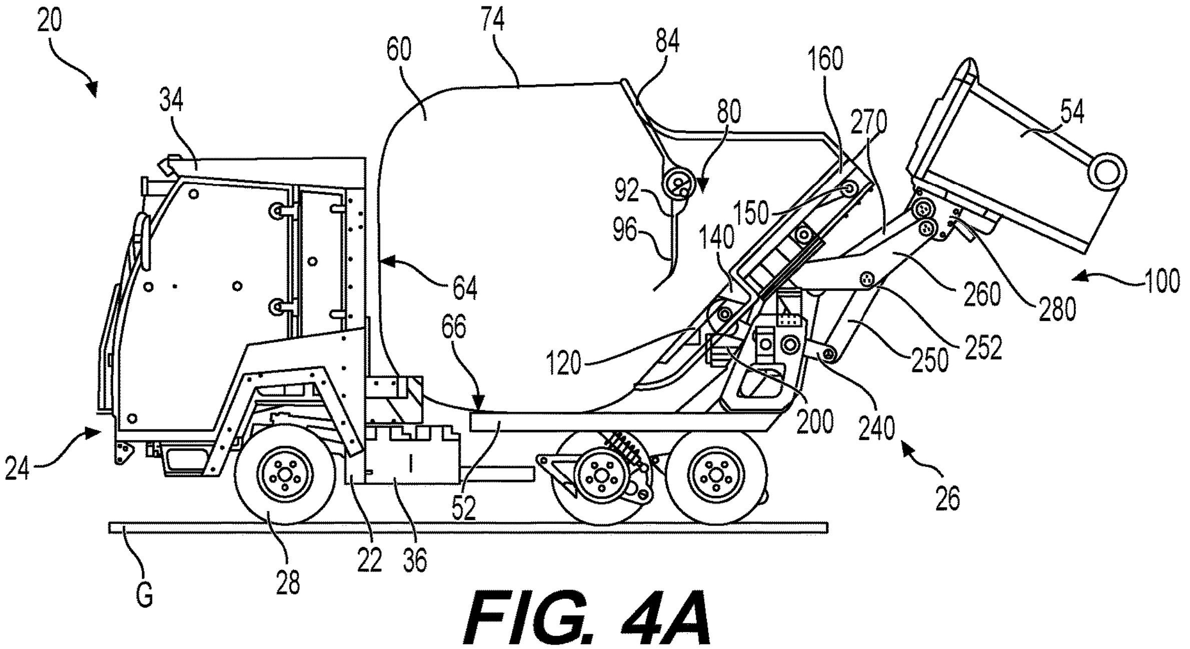
FIG. 4A is a left side elevation view of the truck of FIG. 1A, with the packer plate in a retracted position and the lift arm lowering the bin toward the ground surface.
Figure 4B:
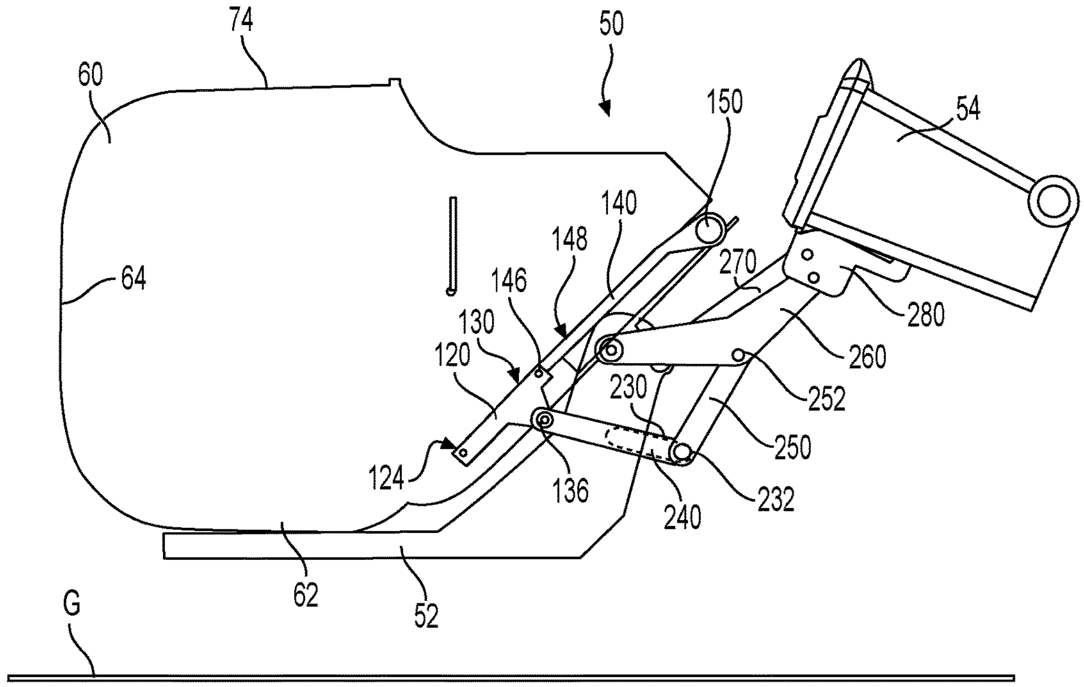
FIG. 4B is a schematic left side elevation view of the assembly of FIG. 1A, with the packer plate in the retracted position and the lift arm lowering the bin toward the ground surface.
Figure 5A:
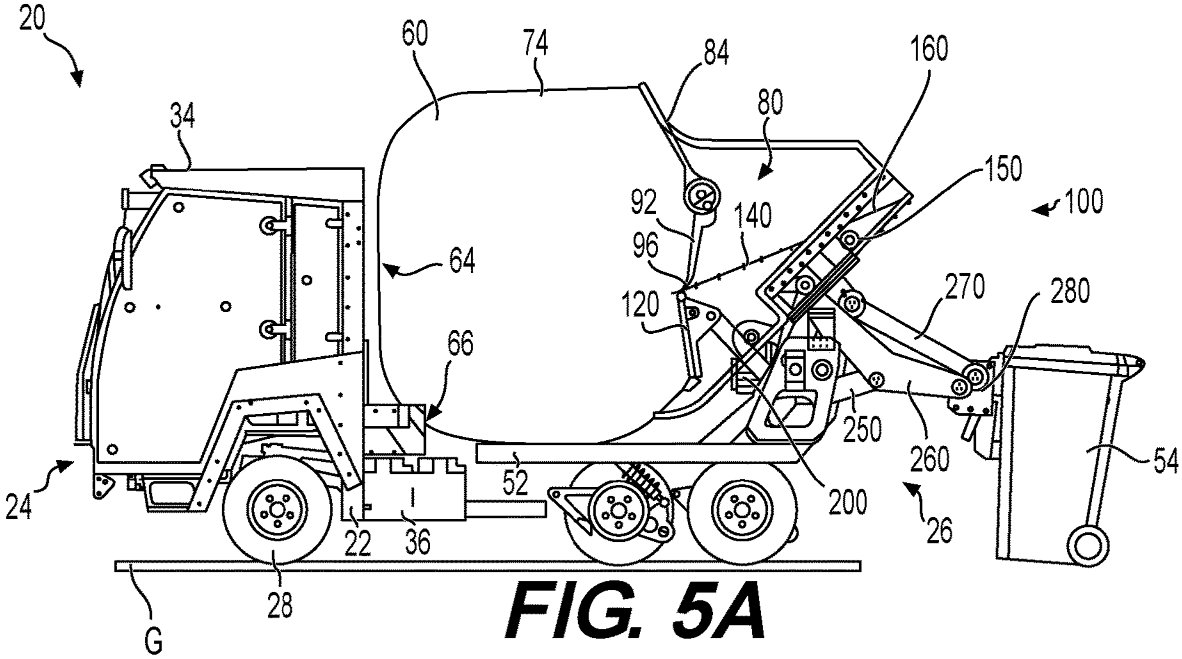
FIG. 5A is a left side elevation view of the truck of FIG. 1A, with the lift arm putting the bin back down on the ground surface and with the packer plate in a compacting position.

The follower panel 140 is movable between a retracted position and a compacting position simultaneously with the packer plate 120. Referring to FIGS. 1A and 1B, when the packer plate 120 and the follower panel 140 are in their respective compacting position, the follower panel 140 extends within the hopper 80 such that the lower portion 144 extends above and forward of the lower packer plate pivot axis 126. The packer plate 120 and the follower panel 140 thus form a V-shape pointing towards the front wall 64. In addition, when the follower panel 140 is moved toward the compacting position, the lower portion 96 of the lower movable panel 92 abuts a front face 148 of the follower panel 140 (as shown in FIG. 5A). Referring to FIGS. 4A and 4B, when the packer plate 120 and the follower panel 140 are in their respective retracted position, the packer plate 120 and the follower panel 140 are substantially parallel. In the present embodiment, the front face 130 of the packer plate 120 and the front face 148 of the follower panel 140 are substantially coplanar.

Referring back to FIGS. 1A and 1B, the follower panel 140 further includes a roller assembly 150 connected to the upper portion 142 thereof for rolling in the track 73 of the rear wall 72. The roller assembly 150 facilitates the fore and aft motion of the follower panel 140 when moved between the compacting position and the retracted position and improves the energy-efficiency of the system 100. In other embodiments, the roller assembly 150 could be replaced by a skate assembly that could slide in the track 73 of the rear wall 72.

Figure 2A:
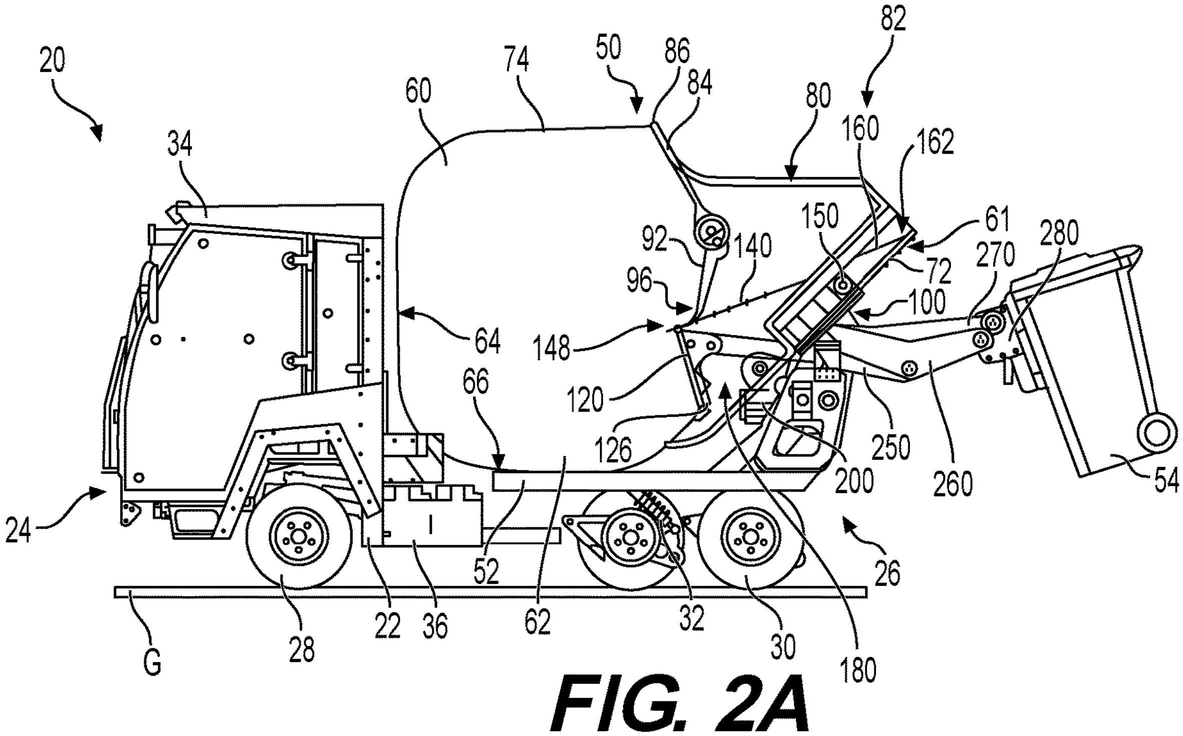
FIG. 2A is a left side elevation view of the truck of FIG. 1A, with the lift arm lifting the bin above the ground surface.

Referring to FIGS. 1A, 2A and 4A, a flexible panel 160 is connected to the upper portion 142 of the follower panel 140. The flexible panel 160 has an upper portion 162 that slides on the rear wall 72 of the container body 60 when the follower panel 140 is in the compacting position, or close to the compacting position (FIGS. 1A and 2A). When in such positions, the flexible panel 160 extends above the roller assembly 150 and reduces the access of solid waste materials to the roller assembly 150. In FIG. 2A, the upper portion 162 is seen bent upwardly near the upper end of the rear wall 72. When the follower panel 140 is in the retracted position (FIG. 4A), or close to the retracted position, the upper portion 162 of the flexible panel 160 projects upwardly and rearwardly of the rear wall 72 of the container body 60 and bends downwardly (as shown in phantom lines in FIG. 3A) so as to direct in the hopper 80 solid waste materials that could fall from the bin 54 as the bin 54 is lifted and tipped in the hopper 80. The flexible panel 160 thus permits lifting and tipping the bin 54 high and forward enough to prevent spilling the solid waste materials on the system 100 and/or the ground surface G before the bin 54 reaches the hopper 80. When in the dump position (FIG. 9A), the flexible panel 160 also prevents spilling the solid waste materials on the system 100. The flexible panel 160 is made of flexible, resilient material, such as rubber or any other suitable polymeric material.

Referring back to FIGS. 1A to 2A, an actuation system 180 is operatively connected to the upper packer plate pivot 134 for pivoting the packer plate 120 between the retracted position and the compacting position about the lower packer plate pivot axis 126, and for moving the follower panel 140 between the compacting position and the retracted position. As will become apparent from the following description, a portion of the actuation system 180 passes through an aperture 182 (FIG. 10) defined in the rear wall 72 of the container body 60 (the rear wall 72 is shown in transparency in FIG. 10). In some embodiments, it is contemplated that the actuation system 180 could include a hydraulic ram assembly connected between the frame 52 and the upper packer plate pivot 134 for pivoting the packer plate 120 and the follower panel 140 between their respective retracted positions and the compacting positions.

Figure 11:
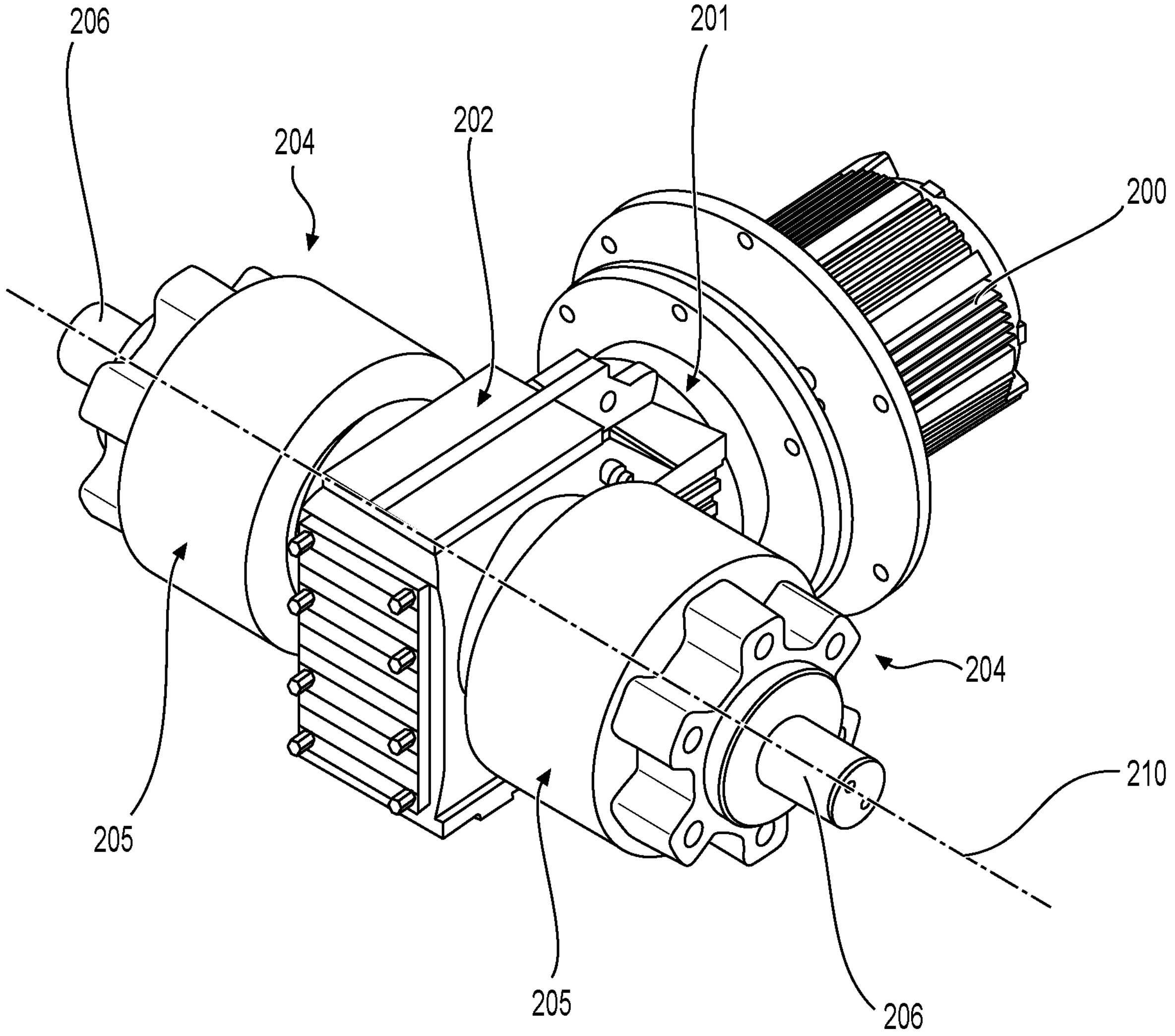
FIG. 11 is perspective view taken from a top, rear, right side of a motor, a bevel gear assembly and left and right gearboxes of the truck of FIG. 1A.

Referring to FIGS. 1A to 5B, the system 100 further includes a motor 200 connected to the frame 52. The motor 200 is an electric motor powered by the power system of the truck 20. In other embodiments, the motor 200 could be a hydraulic motor powered by a hydraulic system of the truck 20. The motor 200 is located under the container body 60, and more particularly at the rear of the rear wall 72. The motor 200 is also mounted longitudinally to the frame 52 and has an output shaft (not shown) pointing towards the rear end 26 of the truck 20. With additional reference to FIG. 11, the output shaft of the motor 200 is connected to a bevel gear assembly 202 which transmits torque from the motor 200 to left and right laterally extending drive shafts (not shown). A brake 201 is also provided between the motor 200 and the bevel gear assembly 202 to prevent unexpected movement of the system 100. Each of the left and right drive shafts is connected to a corresponding gearbox 204 mounted to the frame 52. Only the left gearbox 204 is schematically shown in FIG. 1A. Each gearbox 204 increases the torque provided by the motor 200 and transmitted by the bevel gear assembly 202 and the drive shafts. Each gearbox 204 has a planetary gear set 205 and a gearbox output shaft 206. Only the left gearbox output shaft 206 is shown in FIG. 1A. The left and right gearbox output shafts 206 define a drive axis 210 (FIGS. 1B, 2B, 3B and 11), and both gearbox output shafts 206 are rotatable about the drive axis 210.

The system 100 further includes left and right linkage assemblies 220 (FIG. 10). As the right linkage assembly 220 is a mirror image of the left linkage assembly 220, only the left linkage assembly 220 will be described for the sake of clarity, and will be referred to the linkage assembly 220. The linkage assembly 220 is operatively connected to the motor 200. When the motor 200 is operated, the linkage assembly 220 is configured for lifting the bin 54 above the container body 60, tipping the bin 54 for emptying the solid waste materials into the container body 60, pivoting the packer plate 120 from the retracted position to the compacting position and then from the compacting position to the retracted position, and lowering the bin 54 back down. As will become apparent from the following description, the linkage assembly 220 acts as part of the actuation system 180 of the system 100 for pivoting the packer plate 120 between the retracted position and the compacting position about the lower packer plate pivot axis 126, and for moving the follower panel 140 between the compacting position and the retracted position. The components of the linkage assembly 220 will now be described.

Still referring to FIGS. 1A to 5B, the linkage assembly 220 includes a drive member 230 (best seen in FIGS. 2B, 3B and 5B) that is connected to the gearbox output shaft 206 and that is rotatable about the drive axis 210. The drive member 230 is thus operatively connected to the motor 200. The drive member 230 is shown as a straight link, but could be a disc in another embodiment. The drive member 230 includes a drive member pivot 232 defining a drive member pivot axis 234 (FIGS. 1B and 2B). The drive member pivot axis 234 is parallel to and offset the drive axis 210. A plane 236 (FIGS. 1B and 2B) contains the drive axis 210 and the drive member pivot axis 234.

The linkage assembly 220 further includes a packer plate link 240 rotatably connected to the drive member pivot 232, and pivotally connected to the upper packer plate pivot 134. As seen in FIG. 10, the packer plate link 240 passes through the aperture 182 defined in the rear wall 72 of the container body 60. A plane 242 (FIGS. 1B and 2B) contains the drive member pivot axis 234 and the upper packer plate pivot axis 136. As seen in FIG. 1B, when the packer plate 120 is in the compacting position, an obtuse angle 246 defined between the plane 236 and the plane 242 is greater than 160 degrees, and is close to 180 degrees. Such a configuration of the drive member 230 and the packer plate link 240 increases the compaction force that the packer plate 120 exerts on the solid waste materials contained in the container body 60, and require relatively low torque output from the motor 200 to do so, which permits the selection of an electric motor 200 with a relatively low power output. The combination of this feature with (i) the positioning of the upper packer plate pivot 134 in the upper portion 122 of the packer plate 120, and (ii) the torque transformation between the output shaft of the motor 200 and the gearbox output shaft 206 via the bevel gear assembly 202 and the gearbox 204 provides for an energy-efficient actuation system 180.

Still referring to FIGS. 1A to 5B, the linkage assembly 220 further includes a lift arm link 250 (best seen in FIGS. 3A to 5B) rotatably connected to the drive member pivot 232, and pivotally connected to an intermediate pivot 252 of a lift arm 260. The lift arm 260 is structured for lifting the bin 54 and the solid waste materials contained therein from the ground surface G through an arc (FIGS. 1A to 3B) to an inverted position to allow the solid waste materials to flow by gravity from the bin 54 into the hopper 80. The lift arm 260 is V-shaped, but could be shaped otherwise in other embodiments. For example, the lift arm 260 could have an arcuate shape in another embodiment. As best seen in FIG. 2B, a front end 262 of the lift arm 260 is pivotally connected to the frame 52 at pivot 264. The lift arm 260 further has a rear end including a pivot 266 defining a tipping pivot axis 268. The intermediate pivot 252 is thus positioned longitudinally between the pivot 264 and the pivot 266.

Figure 2B:
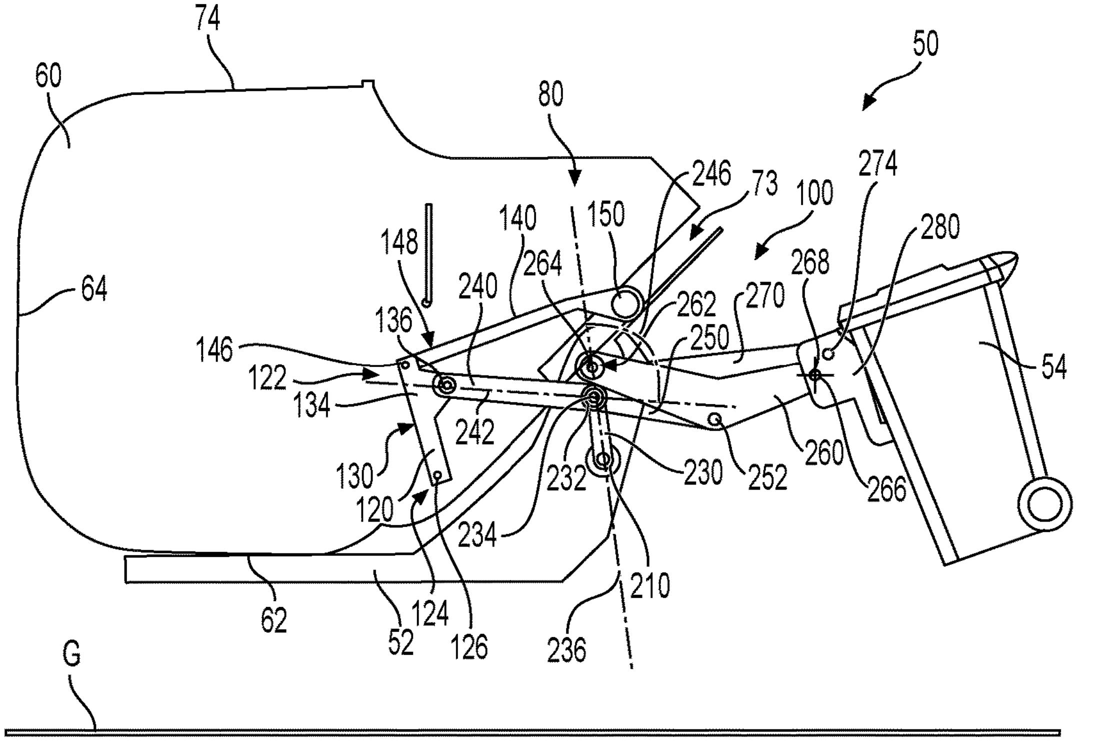
FIG. 2B is a schematic left side elevation view of the assembly of FIG. 1A, with the lift arm lifting the bin above the ground surface.
Figure 5B:
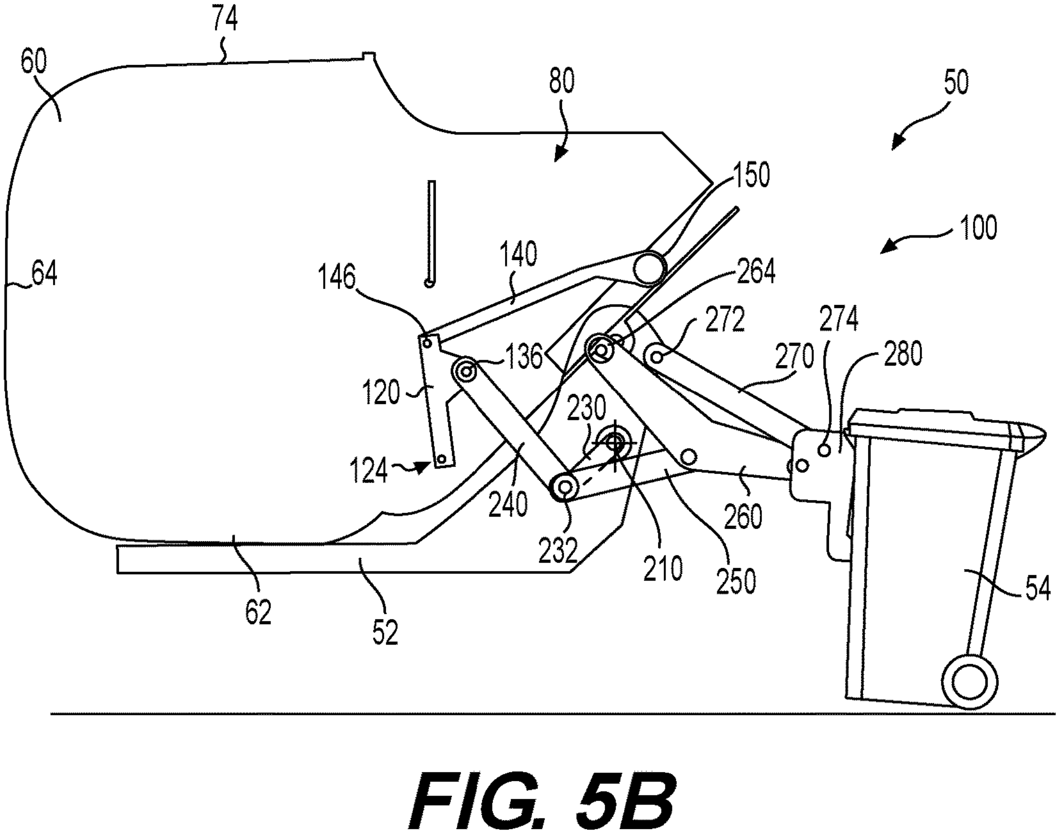
FIG. 5B is a schematic left side elevation view of the assembly of FIG. 1A, with the lift arm putting the bin back down on the ground surface and with the packer plate in the compacting position.

The linkage assembly 220 further includes a tipping arm 270 having a front end pivotally connected to the frame 52 at pivot 272 being offset the pivot 264 (FIG. 5B). The tipping arm 270 is adapted for tipping the bin 54 in the container body 60 when lifted above the container body 60 by the lift arm 260. The tipping arm 270 has a rear end including a pivot 274 being offset of the pivot 266 (FIG. 2B). The tipping arm 270 is disposed laterally offset of the lift arm 260 to avoid interference therebetween. Furthermore, the shape, dimensions and relative position of any one of the drive member 230, the packer plate link 240, the lift arm link 250, the lift arm 260, and the tipping arm 270 are selected to avoid interference therebetween during the motions of the system 100 about to be described.

It is also to be noted that in, the present embodiment, at least one of the drive member 230, the packer plate link 240, the lift arm link 250, the lift arm 260, and the tipping arm 270 is made of fiber-reinforced polymeric materials, such as fiberglass or carbon fiber composite materials. Using such materials having high strength-to-weight ratios enables the system 100 to lift a relatively high payload (i.e. mass of the bin 54 and its content) with a relatively low power output motor 200. The drive member 230, the packer plate link 240, the lift arm link 250, the lift arm 260, and the tipping arm 270 could also be made of aluminum alloys, or steel in some other embodiments.

A gripping claw 280 is pivotally connected to the lift arm 260 at the pivot 266 and to the tipping arm 270 at the pivot 274. The gripping claw 280 is adapted to move between a gripping position and a release position. When the gripping claw 280 engages a handhold of the bin 54 (or any other suitable gripping point of the bin 54), the gripping claw 280 is moved from the release position to the gripping position and grips the handhold of the bin 54. The bin 54 can then be lifted by the lift arm 260 (FIGS. 1A to 3B), and the gripping claw 280 and the bin 54 are pivoted forwardly about tipping pivot axis 268 by the tipping arm 270. When the gripping claw 280 and the bin 54 are lowered back down (FIGS. 3A to 5B), the gripping claw 280 and the bin 54 are pivoted rearwardly about the tipping pivot axis 268 by the tipping arm 270. When the bin 54 is put back down on the ground surface G, the gripping claw 280 is moved from the gripping position to the release position for releasing the empty bin 54. It is to be noted that the gripping claw 280 could be replaced in other embodiments by an automated arm capable of gripping and releasing the bin 54 in an automated fashion, or by a hook assembly capable of engaging and lifting the bin 54.

Referring now to FIGS. 1A to 5B, an illustrative scenario describing the sequence of actions performed by the system 100 is provided to explain its functioning. Referring to FIGS. 1A and 1B, the truck 20 is first positioned to have the bin 54 near of the rear end 26 of the truck 20. The gripping claw 280 is positioned for gripping the bin 54 and is moved from the release position to the gripping position.

Initially, the lift arm 260 is in the lowered position, the drive member 230 is at a position of about 10 o'clock (best seen in FIG. 1B), the packer plate 120 and the follower panel 140 are in their respective compacting position. The motor 200 is operated to have the output shaft thereof rotating in a first direction (for example, in the clockwise direction when seen from the rear end 26 of the truck 20). As the output shaft rotates, the gearbox output shaft 206 rotates and makes the drive member 230 rotate clockwise when seen from the left side of the truck 20 as in the FIGS. 1A to 5B.

When the drive member 230 is rotated further and reaches a position of about 12 o'clock (best seen in FIG. 2B), the bin 54 is lifted from the ground surface G by the lift arm 260, and the packer plate 120 and the follower panel 140 are moved from their respective compacting position to their respective retracted position.

When the drive member 230 is rotated further and reaches a position of about 2 o'clock (best seen in FIG. 3B), the bin 54 is lifted above the container body 60, tipped in the hopper 80 by the combined actions of the lift arm 260 and the tipping arm 270 pivoting the gripping claw 280 about the tipping pivot axis 268, and the packer plate 120 and the follower panel 140 have almost reached their respective retracted position. The content of the bin 54 is emptied in the hopper 80 and may cause the lower movable panel 92 to pivot about the lower panel pivot axis 94 towards the front wall 64.

When the drive member 230 is rotated further and reaches a position of about 4 o'clock (best seen in FIG. 4B), the bin 54 is lowered by the lift arm 260, and the packer plate 120 and the follower panel 140 have reached their respective retracted position and are substantially parallel. The solid waste materials still present in the hopper 80 have the opportunity to flow by gravity under the lower movable panel 92 and reach the inside of the container body 60.

When the drive member 230 is rotated further and reaches a position of about 8 o'clock (best seen in FIG. 5B), the bin 54 is lowered back down by the lift arm 260 until the bin 54 rests on the ground surface G. In some embodiments, the gripping claw 280 is moved from the gripping position to the release position before the bin 54 touches the ground G, but remains supported by the gripping claw 280 until the bin 54 rests on the ground surface G. Meanwhile, the packer plate 120 and the follower panel 140 are moved from their respective retracted position to their respective compacting position and while doing so, the lower portion 96 of the lower movable panel 92 abuts the front face 148 of the follower panel 140 and keeps the solid waste materials inside the container body 60 (as in FIG. 2A).

Referring back to FIG. 1B, as the rotation of the drive member 230 is completed (i.e. reaches a position of about 10 o'clock), the packer plate 120 and the follower panel 140 have reached their respective compacting position, and the packer plate 120 compacts the solid waste materials contained in the container body 60.

It is to be noted that all of the above-described actions of the system 100 were performed over one continuous rotation of the drive member 230 driven by the motor 200. It is contemplated that in other embodiments the above-described actions could be performed over more than one rotation of the drive member 230 or by back and forth partial rotations of the drive member 230.

Figure 6A:
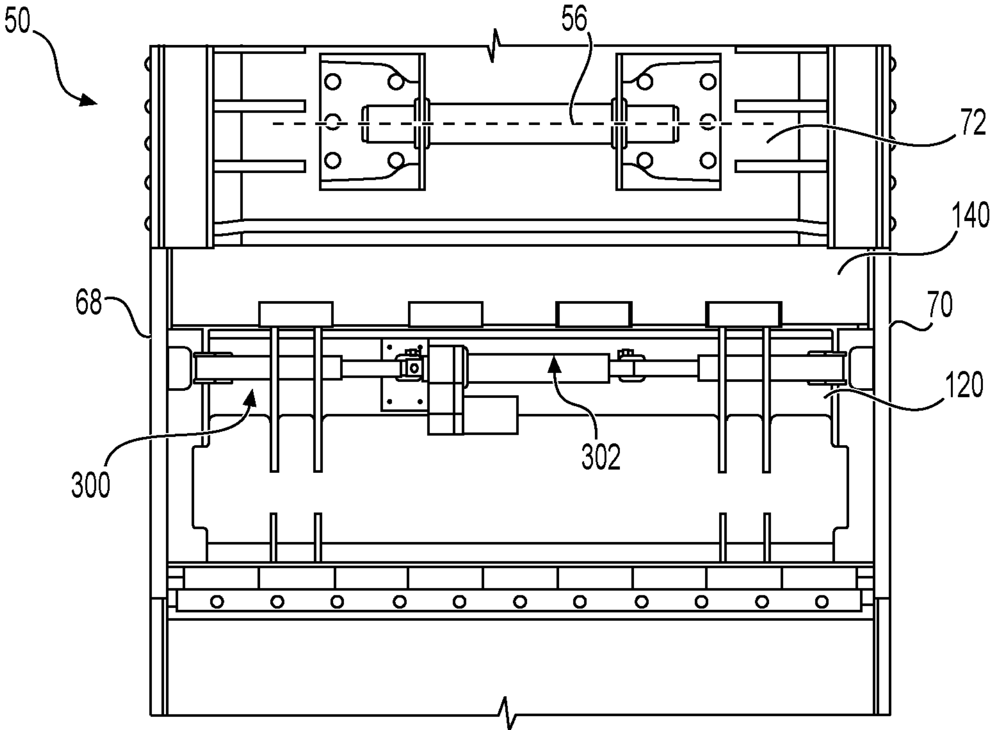
FIG. 6A is an enlarged, bottom plan view of a portion of the assembly of FIG. 1A, with a lock shown in an unlocked position.
Figure 6B:
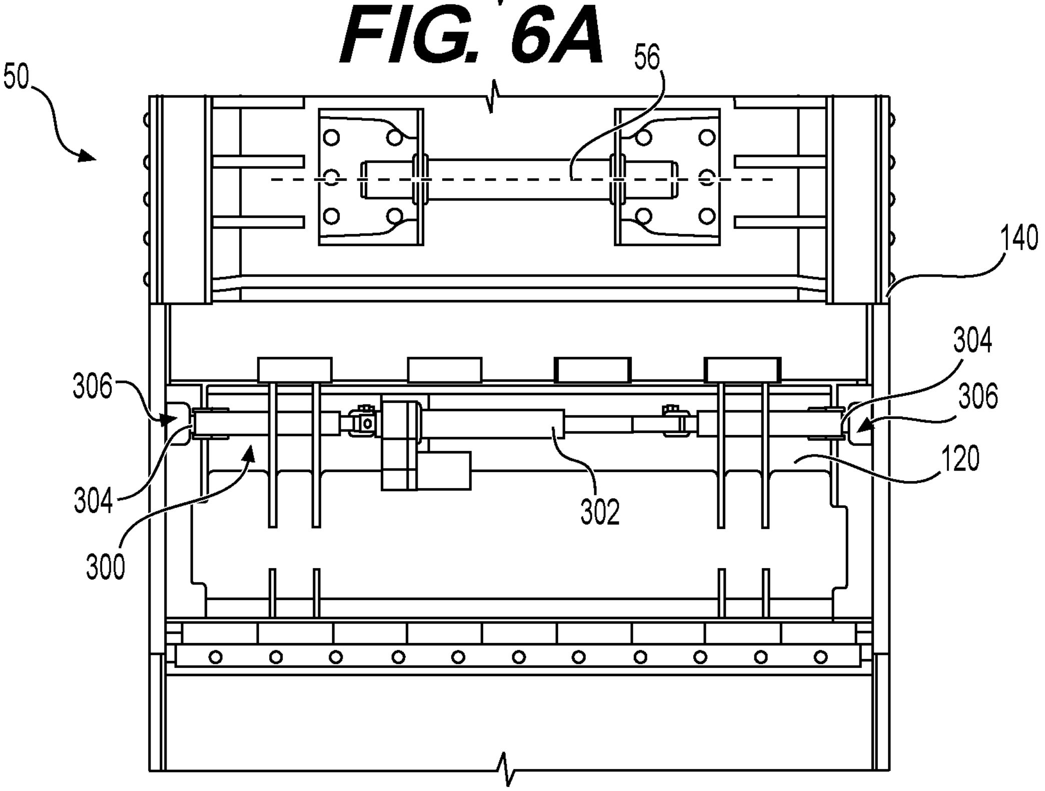
FIG. 6B is an enlarged, bottom plan view of a portion the assembly of FIG. 1A, with the lock in a locked position.

Referring now to FIGS. 6A to 9B, the sequence of actions for pivoting the container body 60 about the container pivot axis 56 (FIGS. 6B and 8B) will be described. As best seen in FIGS. 6A and 6B, the collection and compaction container assembly 50 further includes a lock 300 movable between an unlocked position (FIG. 6A) and a locked position (FIG. 6B). The lock 300 is movable between the unlocked and locked positions using a linear actuator 302 connected to the rear face 132 of the packer plate 120. When the lock 300 is in unlocked position, the packer plate 120 is pivotable within the container body 60 between the retracted and compacting positions. When moved from the unlocked position to the locked position, left and right pins 304 (FIG. 6B) are moved laterally outwardly and are received in apertures 306 (FIGS. 6B and 7A) defined in the left and right side walls 68, 70 of the container body 60.

Referring to FIGS. 7A and 7B, when the lock 300 is in the locked position, the packer plate 120 is maintained in the retracted position, and the lift arm 260, the tipping arm 270 and the gripping claw 280 are raised above the ground surface G. When the motor 200 is operated so as to have the output shaft thereof rotating in the first direction (for example, in the clockwise direction when seen from the rear end 26 of the truck 20), the drive member 230 is rotated clockwise when seen for the left side of the truck 20. Since the packer plate 120 is maintained in the retracted position, the rotation of the drive member 230 pushes the packer plate link 240 upwardly and causes the container body 60 to pivot upwardly about the container pivot axis 56 from the rest position to the dump position (seen in FIGS. 9A and 9B).

Referring to FIGS. 8A and 8B where the container body 60 is shown in an intermediate position between the rest position and the dump position, it can be seen that when the packer plate 120 is maintained in the retracted position by the lock 300 being in the locked position, having the drive member 230 positioned at about 8 o'clock has a different effect as the one illustrated in FIG. 5B where the packer plate 120 is moving from the retracted position to the compacting position.

Referring to FIGS. 9A and 9B where the container body 60 has reached the dump position, it can be seen that when the packer plate 120 is maintained in the retracted position by the lock 300 being in the locked position, having the drive member 230 positioned at about 10 o'clock has a different effect as the one illustrated in FIG. 1B where the packer plate 120 is in the compacting position. When the container body 60 has reached the dump position, it is also to be noted that the lift arm 260, the tipping arm 270 and the gripping claw 280 remain above the ground surface G. The container body 60 remains in the dump position until emptied from its content flowing by gravity from the container body 60 through the hopper 80, and passing under the upper and lower movable panels 84, 92 as illustrated in FIG. 9A.

To pivot the container body 60 downwardly from the dump position (FIGS. 9A and 9B) to the rest position (FIGS. 7A and 7B), the motor 200 is operated to have the output shaft thereof rotating in a second direction (for example, in the counterclockwise direction when seen from the rear end 26 of the truck 20). When the container body 60 has reached the rest position, the left and right pins 304 of the lock 300 are moved laterally inwardly by the linear actuator 302 out of their respective aperture 306, and the truck 20 is ready to start collecting and compacting solid waste materials.

Again, it is to be noted that all of the above-described sequence of actions for pivoting the container body 60 about the container pivot axis 56 were performed by rotating the drive member 230, which is driven by the motor 200, in the first and second directions. As such, the motor 200 is thus capable of driving the motions of lifting the bin 54 above the container body 60, tipping the bin 54 for emptying the solid waste materials into the container body 60, pivoting the packer plate 120 from the retracted position to the compacting position and then from the compacting position to the retracted position, lowering the bin 54 back down, and when the lock 300 is moved in the locked position, pivoting the container body 60 between the rest position and the dump position.

Referring to FIG. 10, a torsion spring 310 is connected between the frame 52 and the container body 60. The torsion spring 310 extends around the container pivot axis 56 and is configured to uncoil so as to assist in pivoting the container body 60 upwardly from the rest position to the dump position. The motor 200 provides sufficient force to recoil the torsion spring 310 when it is rotated in the second direction, and thus the container body 60 is pivotable downwardly from the dump position to the rest position. In other embodiments, the torsion spring 310 could be replaced by a pneumatic linear actuator, or by an electric linear actuator structured and configured for pivoting the container body 60 relative to the frame 52 from the rest position to the dump position. A lock (not shown) could selectively maintain the container body 60 in abutment with the frame 52 when in the rest position, and prevent the torsion spring 310 from pivoting the container body 60 unexpectedly. The lock could also prevent the upward pivoting of the container body 60 during compaction as the density of the solid waste materials increases when compacting. It is contemplated that, in some embodiments being for example of a smaller size/capacity as the one shown in the accompanying Figures, the torsion spring 310 could be omitted.

Figure 12:
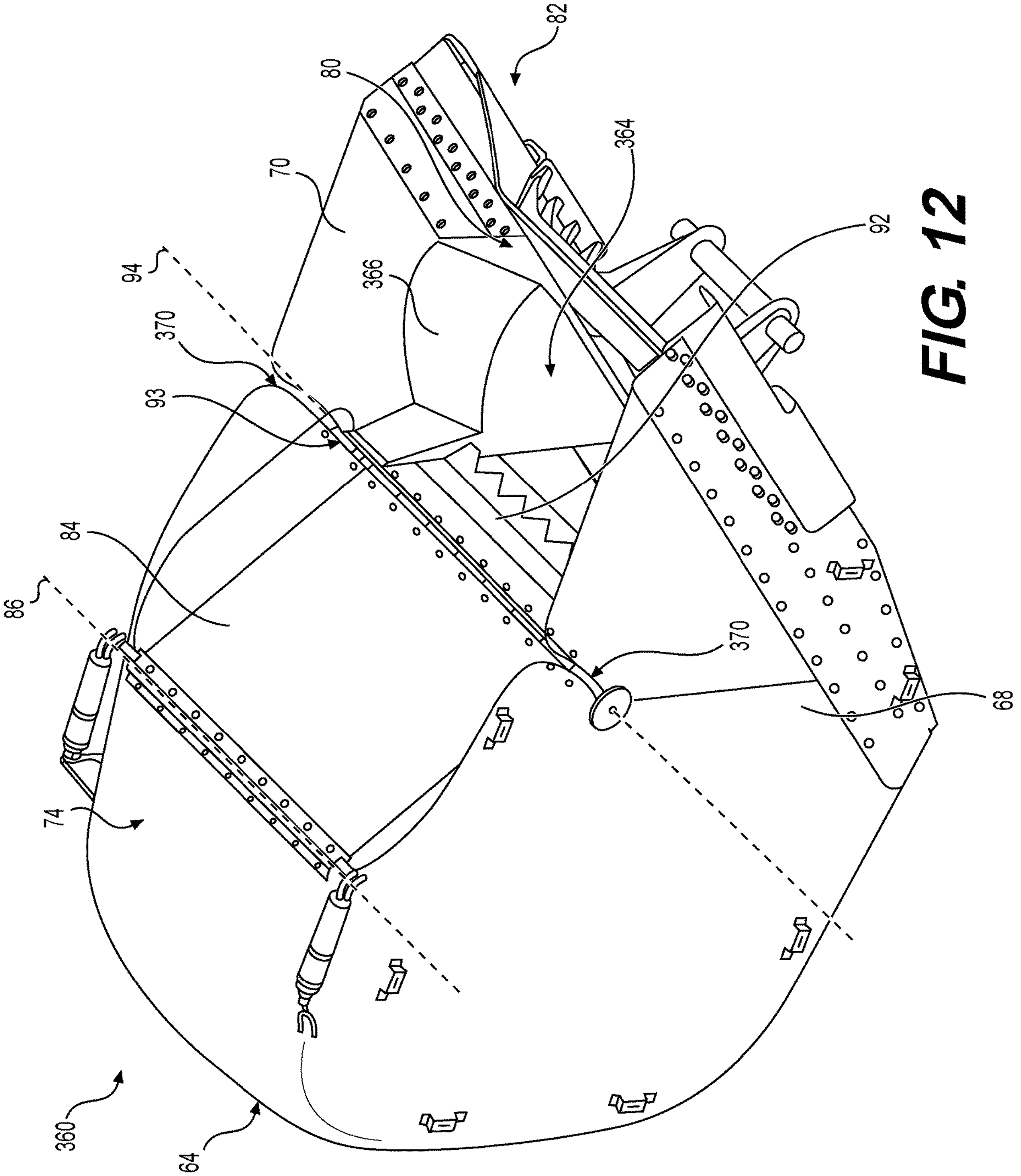
FIG. 12 is a top, rear, left side perspective view of a container body in accordance with another embodiment of the present technology.
Figure 13:
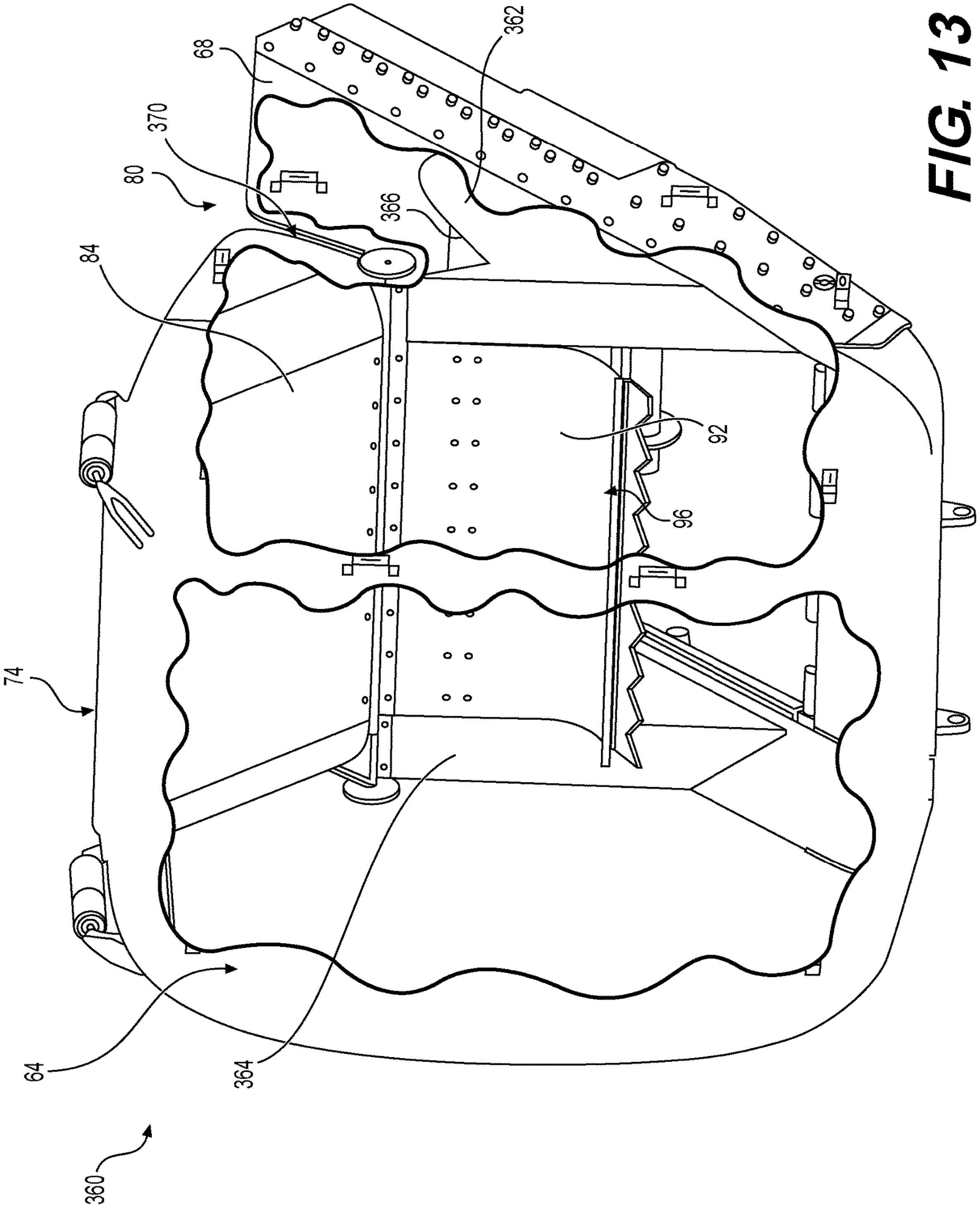
FIG. 13 is a front, left side perspective view of the container body of FIG. 12, with the front wall and the left side wall being fragmented for illustrating the components of the assembly inside the container body.
Figure 14:
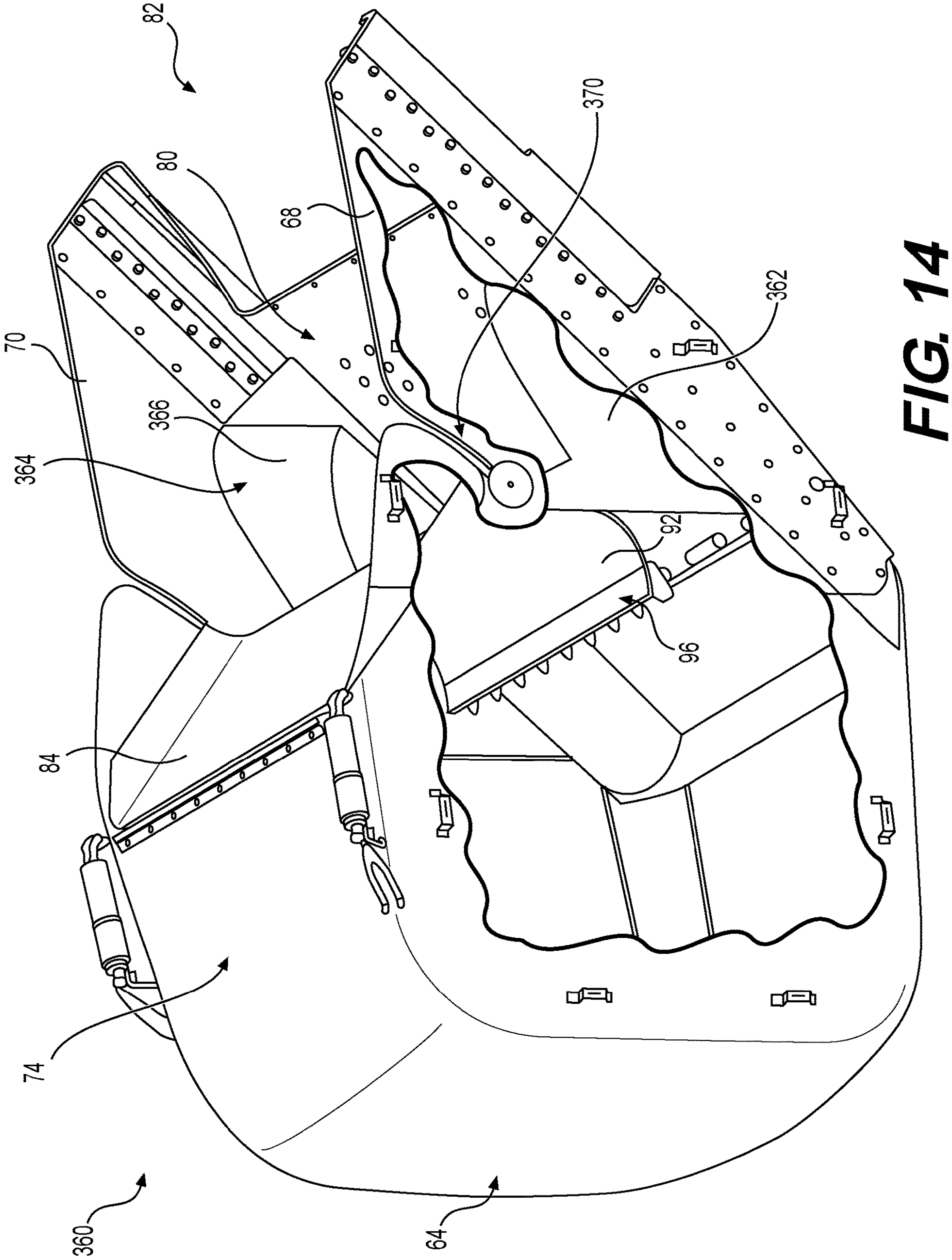
FIG. 14 is a top, front, left side perspective view of the container body of FIG. 12, with the left side wall being fragmented for illustrating the components of the assembly inside the container body.

Referring now to FIGS. 12 to 14, there is shown a second embodiment of a container body 360 in accordance with principles of the present technology. The container body 360 includes components that are the same as or similar to those described with reference to the container body 60. Therefore, for simplicity, components of the container body 360 that are the same as or similar to those of the container body 60 have been labeled with the same reference numerals, and will not be described again in detail.

The container body 360 has a left baffle 362 (FIGS. 13 and 14) that is connected to the left side wall 68 and the rear wall 72. The left baffle 362 projects from the left side wall 68 towards the right side wall 70. Similarly, a right baffle 364 is connected to the right side wall 70 and the rear wall 72. The right baffle 364 projects from the right side wall 70 towards the left side wall 68. The packer plate 120 (not shown in FIGS. 12 to 14) extends laterally between the left and right baffles 362, 364 and is movable between the retracted position and the compacting position so as to move the solid waste materials from rearward the baffles 362, 364 to forward the baffles 362, 364. The left and right baffles 362, 364 assist in keeping the solid waste materials contained in the container body 360 during compaction, and reduce the amount of solid waste materials returning back in the hopper 80 unexpectedly. Each of the left and right baffles 362, 364 also includes a deflection plate 366 connected thereto. The deflection plates 366 extend in the hopper 80. The deflection plates 366 are positioned and oriented so as to direct the solid waste materials flowing in the hopper 80 toward the packer plate 120.

The container body 360 also differs from the container body 60 in that the left and right side walls 68, 70 each have an arcuate slot 370 defined therein. The arcuate slots 370 are sized to receive the left and right ends of the hinge 93 defining the lower panel pivot axis 94, and allow displacement of the hinge 93 in and out of the arcuate slot 370 when the lock 90 is in the unlocked position and when the container body 60 is tipped in the dump position. Furthermore, having the left and right ends of the hinge 93 extending in the arcuate slots 370 and extending on the outer faces of the left and right side walls 68, 70 reinforce the left and right side walls 68, 70, thereby reducing the bulging and/or deformation of the left and right side walls 68, 70 during compaction of the solid waste materials inside the container body 360.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A system for lifting and tipping a bin containing solid waste materials in a container body, and for compacting the solid waste materials in the container body, the system comprising:

a frame;

a motor connected to the frame;

a packer plate pivotally connectable to the container body and being pivotable between a retracted position and a compacting position within the container body, the packer plate being configured for compacting the solid waste materials in the container body when moved from the retracted position to the compacting position; and at least one linkage assembly operatively connected to the motor, and in response to the motor operating, the at least one linkage assembly being configured for lifting the bin above the container body, tipping the bin for emptying the solid waste materials into the container body, pivoting the packer plate from the retracted position to the compacting position and then from the compacting position to the retracted position, and lowering the bin back down, the at least one linkage assembly including:

a lift arm pivotally connected to the frame and structured for lifting the bin above the container body, the lift arm having an intermediate pivot;

a tipping arm pivotally connected to the frame and adapted for tipping the bin in the container body when lifted above the container body by the lift arm;

a drive member operatively connected to the motor, the drive member being adapted for rotating about a drive axis, and including a drive member pivot;

a packer plate link rotatably connected between the drive member pivot and the packer plate; and a lift arm link rotatably connected between the drive member pivot and the intermediate pivot, and in response to rotation of the drive member about the drive axis, the at least one linkage assembly being configured for:

lifting the bin above the container body with the lift arm, tipping the bin with the tipping arm for emptying the solid waste materials into the container body, pivoting the packer plate from the retracted position to the compacting position and then from the compacting position to the retracted position, and lowering the bin back down with the lift arm.

2. The system of claim 1, wherein, in response to one continuous rotation of the drive member about the drive axis, the at least one linkage assembly being configured for:

lifting the bin above the container body, tipping the bin for emptying the solid waste materials into the container body, pivoting the packer plate from the retracted position to the compacting position and then from the compacting position to the retracted position, and lowering the bin back down.

3. The system of claim 1, wherein:

the drive member pivot defines a drive member pivot axis, the packer plate includes an upper packer plate pivot defining an upper packer plate pivot axis, the packer plate link being pivotally connected to the upper packer plate pivot, a first plane contains the drive axis and the drive member pivot axis, a second plane contains the drive member pivot axis and the upper packer plate pivot axis, and when the packer plate is in the compacting position, an obtuse angle defined between the first plane and the second plane is greater than 160 degrees.

4. The system of claim 1, wherein the motor drives a gearbox output shaft, the gearbox output shaft rotating about the drive axis, and the drive member is connected to the gearbox output shaft.

5. The system of claim 1, wherein the packer plate has an upper portion and a lower portion, and when connected to the container body, the packer plate is configured to pivot between the retracted position and the compacting position about a lower packer plate pivot axis extending along the lower portion of the packer plate.

6. The system of claim 5, further comprising a follower panel having an upper portion and a lower portion, the lower portion of the follower panel being pivotally connected to the upper portion of the packer plate about a follower panel axis, and the follower panel being movable between a retracted position and a compacting position simultaneously with the packer plate.

7. A solid waste materials collection and compaction container assembly comprising:

a container body including:

a floor;

a front wall connected to a front end of the floor and extending upwardly from the floor;

a left side wall connected to the floor and the front wall, the left side wall extending upwardly from a left end of the floor and rearward of the front wall;

a right side wall connected to the floor and the front wall, the right side wall extending upwardly from a right end of the floor and rearward of the front wall;

a rear wall connected to the floor and to the left and right side walls, the rear wall extending upwardly from a rear end of the floor; and a top wall connected to the front wall and to the left and right side walls, the top wall extending over a portion of the floor; and a system for lifting and tipping a bin containing solid waste materials in the container body, and for compacting the solid waste materials in the container body, the system including:

a frame pivotally supporting the container body about a container pivot axis, the container body being pivotable about the container pivot axis between a rest position and a dump position;

a motor connected to the frame;

a packer plate pivotally connected to the container body and being pivotable between a retracted position and a compacting position within the container body, the packer plate being configured for compacting the solid waste materials in the container body when pivoted from the retracted position to the compacting position; and at least one linkage assembly operatively connected to the motor, in response to the motor operating, the at least one linkage assembly being configured for lifting the bin above the container body, tipping the bin for emptying the solid waste materials into the container body, pivoting the packer plate from the retracted position to the compacting position and then from the compacting position to the retracted position, and lowering the bin back down, a lock movable between an unlocked position and a locked position, in response to the lock being in the unlocked position, the packer plate being pivotable within the container body between the retracted and compacting positions, and in response to the lock being in the locked position, the packer plate being maintained in the retracted position, and operating the motor in a first direction causing the container body to pivot upwardly about the container pivot axis between the rest position and the dump position; and a linear actuator connected to a rear face of the packer plate, the linear actuator being configured for moving the lock between the locked and unlocked positions.

8. The container assembly of claim 7, wherein, in response to the lock being in the locked position, operating the motor in a second direction causes the container body to pivot downwardly about the container pivot axis between the dump position and the rest position.

9. The container assembly of claim 7, wherein the motor is located under the container body.

10. The container assembly of claim 7, further comprising a torsion spring connected between the frame and the container body, the torsion spring being adapted for pivoting the container body about the container pivot axis from the rest position to the dump position.

11. A truck comprising:

a truck frame;

a vehicle motor connected to the truck frame;

at least three wheels operatively connected to the frame, at least one of the at least three wheels being driven by the vehicle motor; and the solid waste materials collection and compaction container assembly of claim 7 connected to the truck frame.

12. The truck of claim 11, wherein the motor of the system and the vehicle motor are electric motors.

13. A solid waste materials collection and compaction container assembly comprising:

a container body including:

a floor;

a front wall connected to a front end of the floor and extending upwardly from the floor;

a left side wall connected to the floor and the front wall, the left side wall extending upwardly from a left end of the floor and rearward of the front wall;

a right side wall connected to the floor and the front wall, the right side wall extending upwardly from a right end of the floor and rearward of the front wall;

a rear wall connected to the floor and to the left and right side walls, the rear wall extending upwardly from a rear end of the floor; and a top wall connected to the front wall and to the left and right side walls, the top wall extending over a portion of the floor;

a system for lifting and tipping a bin containing solid waste materials in the container body, and for compacting the solid waste materials in the container body, the system including:

a frame pivotally supporting the container body about a container pivot axis, the container body being pivotable about the container pivot axis between a rest position and a dump position;

a motor connected to the frame;

a packer plate pivotally connected to the container body and being pivotable between a retracted position and a compacting position within the container body, the packer plate being configured for compacting the solid waste materials in the container body when pivoted from the retracted position to the compacting position; and at least one linkage assembly operatively connected to the motor, in response to the motor operating, the at least one linkage assembly being configured for lifting the bin above the container body, tipping the bin for emptying the solid waste materials into the container body, pivoting the packer plate from the retracted position to the compacting position and then from the compacting position to the retracted position, and lowering the bin back down, a follower panel having an upper portion and a lower portion, the lower portion of the follower panel being pivotally connected to the packer plate about a follower panel axis, the upper portion of the follower panel including a roller assembly for rolling along a portion of the container body, the follower panel being movable between a retracted position and a compacting position simultaneously with the packer plate; and a lower movable panel extending in the container body, the follower panel abutting the lower movable panel when in the compacting position.

14. The container assembly of claim 13, wherein the lower movable panel is configured for:

pivoting towards the front wall of the container body when the solid waste materials are introduced in the container body, keeping the solid waste materials inside the container body when the container body is in the rest position, and moving towards the rear wall when the container body is pivoted from the rest position to the dump position.

15. The container assembly of claim 13, further comprising an upper movable panel pivotally connected to the top wall of the container body, the upper movable panel being selectively pivotable about an upper panel pivot axis between a closed position and an open position when the container body is pivoted from the rest position to the dump position.

16. The container assembly of claim 13, wherein the motor is located under the container body.

17. The container assembly of claim 13, further comprising a torsion spring connected between the frame and the container body, the torsion spring being adapted for pivoting the container body about the container pivot axis from the rest position to the dump position.

18. A truck comprising:

a truck frame;

a vehicle motor connected to the truck frame;

at least three wheels operatively connected to the frame, at least one of the at least three wheels being driven by the vehicle motor; and the solid waste materials collection and compaction container assembly of claim 13 connected to the truck frame.

19. The truck of claim 18, wherein the motor of the system and the vehicle motor are electric motors.

* * * * *